US009804188B2

(12) United States Patent
Jeong et al.

(10) Patent No.: US 9,804,188 B2
(45) Date of Patent: Oct. 31, 2017

(54) INERTIAL SENSOR

(71) Applicant: Hitachi Automotive Systems, Ltd., Hitachinaka-shi, Ibaraki (JP)

(72) Inventors: Heewon Jeong, Tokyo (JP); Kiyoko Yamanaka, Tokyo (JP); Masahide Hayashi, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 171 days.

(21) Appl. No.: 14/763,020

(22) PCT Filed: Nov. 13, 2013

(86) PCT No.: PCT/JP2013/080701
§ 371 (c)(1),
(2) Date: Jul. 23, 2015

(87) PCT Pub. No.: WO2014/115404
PCT Pub. Date: Jul. 31, 2014

(65) Prior Publication Data
US 2015/0355218 A1    Dec. 10, 2015

(30) Foreign Application Priority Data
Jan. 24, 2013    (JP) .............................. 2013-011021

(51) Int. Cl.
*G01P 15/097*    (2006.01)
*G01P 15/08*    (2006.01)
(Continued)

(52) U.S. Cl.
CPC ........ *G01P 15/097* (2013.01); *G01C 19/5747* (2013.01); *G01P 15/0802* (2013.01); *G01P 15/125* (2013.01); *G01P 2015/0882* (2013.01)

(58) Field of Classification Search
CPC .. G01P 15/097; G01P 15/0802; G01P 15/125; G01P 2015/0882; G01C 19/5747
See application file for complete search history.

(56) References Cited

U.S. PATENT DOCUMENTS 5,962,784 A * 10/1999 Hulsing, II ........ G01C 19/5755
73/504.03
2002/0078746 A1* 6/2002 Mochida ............ G01C 19/5719
73/504.12
(Continued)

FOREIGN PATENT DOCUMENTS

JP    4734756 B2    7/2011
JP    5037690 B2    10/2012

OTHER PUBLICATIONS

International Search Report (PCT/ISA/210) dated Dec. 10, 2013, with English translation (two (2) pages).
(Continued)

*Primary Examiner* — Ryan Walsh
(74) *Attorney, Agent, or Firm* — Crowell & Moring LLP

(57) ABSTRACT

An inertial sensor not susceptible to temperature change and vibration disturbance in an implementation environment of the inertial sensor is provided. In the present invention, for example, as illustrated in FIG. 9, an extending portion EXU is provided so as to connect to a fixing portion FU3, this extending portion EXU and a third region P3 which configures part of a mass body MS are connected via a support beam BM3 and a support beam BM4, and the support beam BM3 and the support beam BM4 are disposed oppositely with respect to a virtual line IL1. With this, natural frequency of an unwanted mode due to rotation and torsion of the mass body MS can be shifted to a high frequency band.

14 Claims, 12 Drawing Sheets

(51) Int. Cl.
  *G01P 15/125*  (2006.01)
  *G01C 19/5747*  (2012.01)

(56) References Cited

U.S. PATENT DOCUMENTS

| | | | | |
|---|---|---|---|---|
| 2007/0131030 A1* | 6/2007 | Jeong | ................ | G01C 19/5747 |
| | | | | 73/504.12 |
| 2010/0037691 A1* | 2/2010 | Jeong | ................ | G01C 19/5719 |
| | | | | 73/504.12 |
| 2010/0127715 A1* | 5/2010 | Jeong | ................ | G01C 19/5719 |
| | | | | 324/661 |
| 2011/0138912 A1 | 6/2011 | Degawa et al. | | |
| 2013/0098152 A1* | 4/2013 | Jeong | ................ | G01C 19/574 |
| | | | | 73/504.12 |

OTHER PUBLICATIONS

M. Degawa et al., "Laterally-Driven Deformation-Robust MEMS Gyroscopes With Three Sets of Symmetrically Arranged Folded-Beam Suspensions", Transducers 2009, Jun. 21-25, 2009, pp. 664-667.

* cited by examiner

INERTIAL SENSOR

TECHNICAL FIELD

The present invention relates to inertial sensors and, for example, technology effective by being applied to an inertial sensor which measures acceleration or angular rate by detecting a physical quantity due to displacement of a mass body occurring according to application of the acceleration or angular rate.

BACKGROUND

Japanese Patent No. 4734756 (Patent Document 1) describes a structure in which four fixing portions are provided at four corners of a weight and the weight and each of the four fixing portions are connected via support beams.

Japanese Patent No. 5037690 (Patent Document 2) describes technology of inhibiting degradation in measurement accuracy due to fluctuations of detection sensitivity of an inertial sensor by inhibiting fluctuations of natural frequency of the inertial sensor due to stress. Specifically, in a spring system in which a movable portion and a plurality of beams connected thereto are combined, an increase of a spring constant due to tensile stress acting on one beam and a decrease of a spring constant due to compressive stress acting on another beam are cancelled out each other.

Non-Patent Document 1 describes a structure of an inertial sensor in which an open-ended mass body is supported at three points, with symmetrical-type support beams being provided at two points at an open end and with the mass body being connected on a center axis at the remaining one point.

RELATED ART DOCUMENTS

Patent Documents

Patent Document 1: Japanese Patent No. 4734756
Patent Document 2: Japanese Patent No. 5037690

Non-Patent Documents

Non-Patent Document 1: M. Degawa, et al., "LATERALLY-DRIVEN DEFORMATION-ROBUST MEMS GYROSCOPES WITH THREE SETS OF SYMMETRICALLY ARRANGED FOLDED-BEAM SUSPENSIONS", Solid-State Sensors, Actuators and Microsystems Conference, 2009. TRANSDUCERS 2009. International, 21-25 Jun. 2009, pp 664-667.

SUMMARY

Problems to be Solved by the Invention

For example, as a specific application example of an inertial sensor, there is a vehicle sideslip prevention system. This system determines a vehicle sideslip by comparing a value (an instruction value) of a steering angle sensor mounted on a steering wheel and an output value (an actually measured value) of an inertial sensor incorporated in the sideslip prevention system and, based on the result, controls an engine output and a braking force of each of four wheels to perform control so as to prevent the vehicle body from slipping.

In the existing sideslip prevention system, associated components such as an ECU (Electronic Control Portion) for brake control and a brake pressure generating device configured of a hydraulic motor, a solenoid valve for branching brake pressure, and the like reside in an engine room. On the other hand, for the reason in which the inertial sensor is an important component for brake control and a resonance phenomenon is used in the case of an angular rate sensor, the inertial sensor is installed inside the vehicle where vibration removal and vibration isolation measures can be easily taken with relatively less temperature change and vibration disturbance.

Therefore, in addition to the inertial sensor, the ECU, and the brake pressure generating device, the sideslip prevention system is configured of a microcomputer for CAN (Controller Area Network) communication, a cable for transmitting a signal from the inside of the vehicle to the inside of the engine room, harnesses for fixing the inertial sensor and vibration removal and vibration isolation, and the like, thereby posing a problem of additional cost.

Thus, in recent years, for reducing cost of the sideslip system, a move has been active in which the inertial sensor is implemented as one electronic component on an ECU board for hydraulic control together with another integrated circuit (LSI) and a chip capacitor. However, unlike the case in which the internal sensor is implemented inside the vehicle, when the inertial sensor is implemented on the ECU board for hydraulic control, the ECU board for hydraulic control is disposed in the engine room, and therefore the inertial sensor is required to have resistance against temperature change in the engine room and severe environments such as vibration. In particular, vibration due to operation of the hydraulic motor and the solenoid valve in association with brake control includes impact vibration together with cyclic vibration of the valve. Thus, the inertial sensor is put under the environment at high temperature (approximately 125° C.), which is not assumed when the inertial sensor is conventionally used inside the vehicle, with the occurrence of vibration in a wide frequency band equivalent to several tens of g to several hundreds of g at maximum.

Therefore, in view of reducing cost of the sideslip prevention system, when the inertial sensor is mounted on the ECU board for hydraulic control, contrivance against temperature change and vibration disturbance is required in order to keep the performance of the inertial sensor.

An object of the present invention is to provide an inertial sensor that is not susceptible to (is robust against) temperature change and vibration disturbance in the implementation environment of the inertial sensor.

Other problems and novel features will become apparent from the description of the specification and the attached drawings.

Means for Solving the Problems

An inertial sensor in an embodiment includes (a) a mass body including a first region extending in a first direction, a second region extending in the first direction as being a predetermined distance away from the first region in a second direction orthogonal to the first direction, and a third region extending in the second direction so as to be coupled to the first region and the second region, the mass body displaceable in the first direction. And, the inertial sensor includes (b) a first fixing portion connected to the first region via a first support beam, (c) a second fixing portion connected to the second region via a second support beam, (d) a third fixing portion, (e) an extending portion connected to the third fixing portion and extending in the second direction, (f) a third support beam connecting the extending portion and the third region and (g) a fourth support beam connecting the extending portion and the third region. Here, the third support beam and the fourth support beam are disposed oppositely to each other with respect to a virtual line passing through the third fixing portion and extending in the first direction.

Effects of the Invention

According to an embodiment, an inertial sensor that is not susceptible to temperature change and vibration disturbance in the implementation environment of the inertial sensor can be provided.

BRIEF DESCRIPTIONS OF THE DRAWINGS

DETAILED DESCRIPTION

Figure 1:
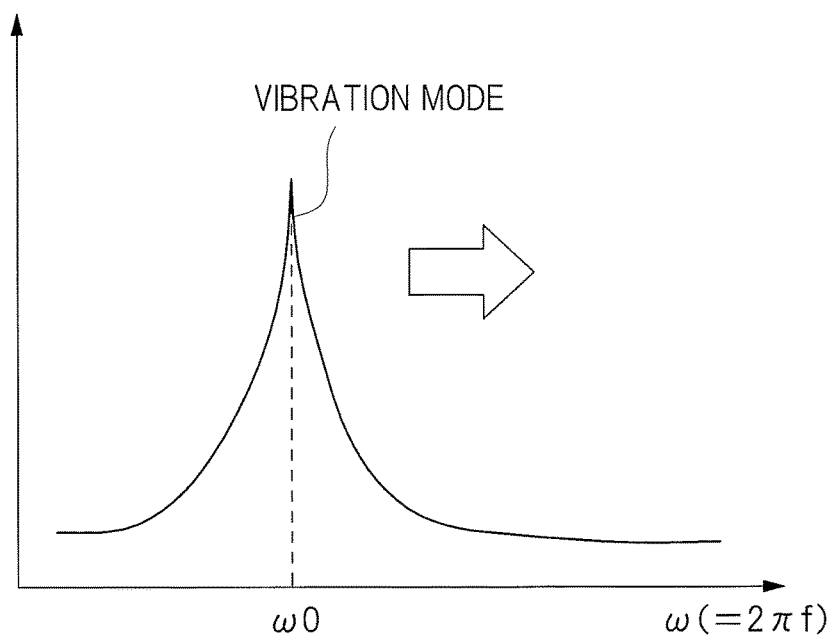
FIG. 1 is a graph illustrating frequency characteristics of an acceleration sensor.

In the following embodiments, description is made by division into a plurality of sections or embodiments when necessary for convenience. However, they are not unrelated to each other unless otherwise explicitly indicated, and have a relation such that one is a modification example, detail, supplemental description, or the like of entirety or part of another.

Also, in the following embodiments, when the number of elements and the like (including a count, numerical value, quantity, range, and the like) are referred, unless, for example, specifically indicated explicitly or considered to be clearly restricted to a specific number on principle, the number is not restricted to that specific number, and may be more than or less than the specific number.

Furthermore, in the following embodiments, it is needless to say that components (including element steps and the like) are not necessarily indispensable unless, for example, specifically indicated explicitly or considered to be clearly indispensable on principle.

Similarly, in the following embodiments, when the shape, positional relation, and the like of the components are referred, they include a shape and the like substantially approximate or similar thereto, or the like unless, for example, specifically indicated explicitly or considered to be clearly not so. This goes the same for the numerical value and range described above.

Also, in all of the drawings for describing the embodiments, identical members are provided with the same reference character in principle, and are not repetitively described. Note that even a plan view may be hatched in order to make the drawing easily understood.

First Embodiment

Description of Related Technology

In the first embodiment, an acceleration sensor is taken up for description as an example of the inertial sensor.

First, basic operation principles of a general acceleration sensor will be briefly described. For example, the acceleration sensor has a mass body capable of being displaced in an X direction as a first direction. That is, when acceleration is applied in the X direction, the mass body is displaced in the X direction. In this mass body, a movable electrode for detection is formed, and a fixed electrode for detection is formed so as to face this movable electrode for detection. In this case, when the mass body is displaced, the movable electrode for detection is displaced accordingly. On the other hand, the fixed electrode for detection is kept fixed and not displaced. Therefore, when acceleration is applied in the X direction to displace the mass body, an inter-electrode distance of a capacitive element formed of the movable electrode for detection and the fixed electrode for detection is changed. The change of the inter-electrode distance of the capacitive element means that electric capacity (electrostatic capacity) of the capacitive element is changed. As such, when acceleration is applied in the X direction, the mass body is displaced in the X direction and, as a result, the electrostatic capacity of the capacitive element is changed. This capacitance change is converted at a voltage-converting portion to a voltage signal and, based on the converted electrical signal, an acceleration signal is outputted from the acceleration sensor. From the above description, the acceleration applied to the acceleration sensor is detected as a capacitance change of the capacitive element, and the detected capacitance change is converted to a voltage signal and, eventually, an acceleration signal is outputted from the acceleration sensor.

As such, the acceleration sensor is configured so that the mass body is displaced when acceleration is externally applied. That is, the acceleration sensor is configured so that the mass body is displaced when acceleration is externally added and this displacement of the mass body is taken as a change in electric capacity (electrostatic capacity) to detect the acceleration.

Therefore, the acceleration sensor is configured of a mass body and an elastically deformable beam for connecting this mass body and a fixing portion. As a result, in the acceleration sensor, a vibration system configured of the mass body and the beam is consequentially configured. This leads to that the acceleration sensor has a natural frequency defined by the mass of the mass body and the spring constant of the beam.

FIG. 1 is a graph illustrating frequency characteristics of an acceleration sensor. In FIG. 1, the horizontal axis represents angular frequency ω (=2πf) of a vibration system configuring the acceleration sensor, and the vertical axis represents the magnitude of amplitude of the vibration system. As illustrated in FIG. 1, it can be found that, for example, in the vibration system configuring the acceleration sensor, a peak is present at an angular frequency ω0. This means that the vibration system configuring the acceleration sensor is prone to vibrate at the angular frequency ω0. This angular frequency ω0 corresponds to natural frequency, and the vibration system configuring the acceleration sensor resonates at this natural frequency. Therefore, a frequency corresponding to the natural frequency is also referred to as a resonance frequency.

In view of detecting acceleration at the acceleration sensor, this natural frequency is intrinsically unnecessary, but is consequentially present because the vibration system is configured in the acceleration sensor. In view of improving detection accuracy of the acceleration sensor, consideration is required for the natural frequency.

That is, noise is desirably less in a frequency band where the natural frequency of the acceleration sensor is present. The reason is that if noise is present in the frequency band where the natural frequency of the acceleration sensor is present, the natural frequency of the acceleration sensor resonates with noise corresponding to vibration disturbance to cause the mass body to vibrate. That is, although no acceleration is externally applied, the natural frequency of the acceleration sensor resonates with noise corresponding to vibration distortion to cause large vibration at the mass body, thereby arousing concerns of erroneous operation as if acceleration is externally applied and, furthermore, an occurrence of failure in the acceleration sensor. From the above description, in the acceleration sensor, it is important to separate the natural frequency of the acceleration sensor from noise corresponding to vibration disturbance by configuring the acceleration sensor so that the natural frequency is present in a frequency band with less noise.

Figure 2:
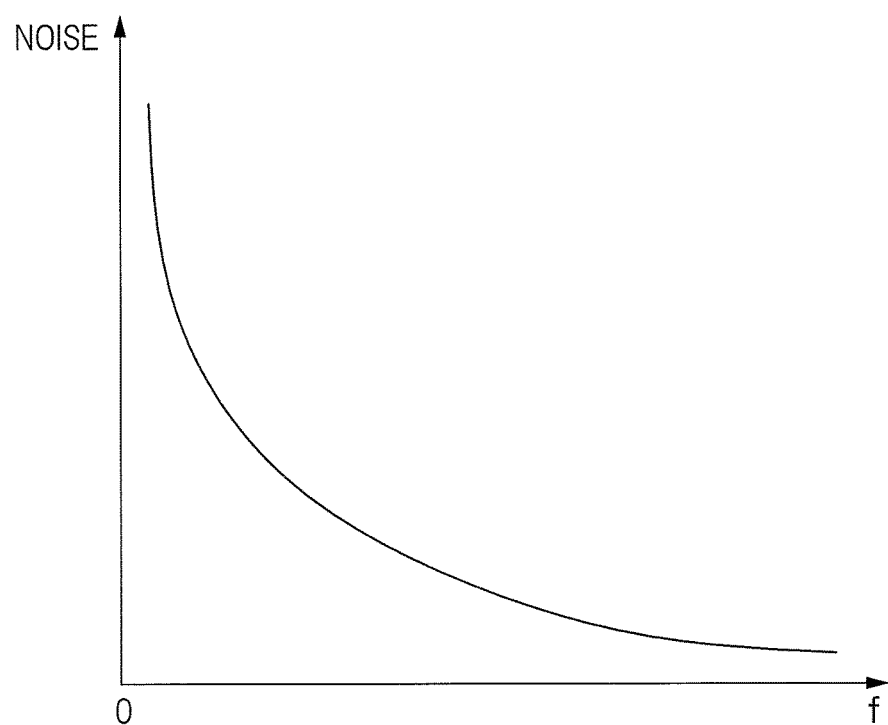
FIG. 2 is a schematic graph illustrating frequency dependency of 1/f noise.

Regarding this point, under the environment of the periphery of a place where the acceleration sensor is disposed, noise called 1/f noise is present. FIG. 2 is a schematic graph illustrating frequency dependency of 1/f noise. In FIG. 2, the horizontal axis represents frequency, and the vertical axis represents the magnitude of 1/f noise. As illustrated in FIG. 2, 1/f noise is noise inversely proportional to frequency, and has a feature of increasing as the frequency of a signal decreases and decreasing as the frequency of the signal increases.

From this, when the natural frequency of the acceleration sensor is present in a low frequency band, 1/f noise also increases. As a result, the natural frequency of the acceleration sensor resonates with noise corresponding to vibration disturbance, thereby increasing concerns that the mass body may vibrate although no acceleration is externally applied. Therefore, it can be found that, when 1/f noise is taken into consideration as noise corresponding to vibration disturbance, the natural frequency of the acceleration sensor is desirably shifted to a high frequency band with less 1/f noise. That is, in consideration of 1/f noise, in order to favorably separate the natural frequency of the acceleration sensor from noise corresponding to vibration disturbance, it can be found that it is important to configure the acceleration sensor so that the natural frequency of the acceleration sensor is shifted to a high frequency band as much as possible.

Here, in the technology described in Patent Document 1, by simply supporting four corners of the mass body by beams, the mass body is suspended to configure a vibration system. In the case of this technology, by adjusting the length of each beam, the spring constant of the beam can be easily changed. Therefore, it is possible to easily adjust the natural frequency defined by the mass of the mass body and the spring constant of the beam. That is, in the vibration system described in Patent Document 1, it can be thought that the natural frequency can be easily shifted to a high frequency band, thereby easily separating vibration disturbance typified by 1/f noise from the natural frequency of the acceleration sensor.

However, in the acceleration sensor, in addition to measures against vibration disturbance, measures against temperature change are also required. For example, distortion occurs due to a temperature change of the periphery of the place where the acceleration sensor is placed and a change of an implemented member of the acceleration sensor with time. As a result, internal stress occurs in the beam configuring the acceleration sensor to change the spring constant of the beam. A change of the spring constant of the beam means that the natural frequency defined by the mass of the mass body and the spring constant of the beam is changed. A change of the natural frequency means that characteristic fluctuations of the acceleration sensor occur. Therefore, in order to inhibit characteristic fluctuations of the acceleration sensor, measures against temperature change of the periphery of the place where the acceleration sensor is placed.

Regarding this point, in the technology described in Patent Document 1, the mass body has a structure resistant to deformation. From this, when distortion occurs in the acceleration sensor due to a change of an implemented member with time and a peripheral temperature change, internal stress tends to occur in the beam which suspends the mass body in order to absorb this distortion. As a result, in the technology described in Patent Document 1, the spring constant of the beam tends to be changed by internal stress added to the beam, and the natural frequency of the acceleration sensor tends to fluctuate. That is, in the technology described in Patent Document 1, the structure is such that fluctuations in natural frequency tends to occur due to a change of an implemented member with time and peripheral temperature change, thereby arousing concern of characteristic fluctuations of the acceleration sensor.

In general, for characteristic fluctuations of the acceleration sensor due to a change of an implemented member with time or peripheral temperature change, initial characteristic correction and electrical correction of intentionally generating a peripheral temperature change so that a characteristic at each temperature point is within a range of specifications are performed. From this, in the technology described in Patent Document 1, it is required to check performance at many temperature points and to perform complex correction arithmetic operation, thereby arousing concern of an increase in manufacturing cost. That is, when an output value from the acceleration sensor at each temperature point exhibits non-linear behavior, output values at many temperature points and complex correction arithmetic operation are required, leading to an increase in manufacturing cost.

Furthermore, even if vibration disturbance typified by 1/f noise and the natural frequency of the acceleration sensor are separated, when vibration disturbance is present in a frequency band adjacent to the natural frequency, the natural frequency is changed with temperature change. Therefore, it can be thought that the natural frequency and vibration disturbance may match each other at a specific temperature. In this case, concerns of erroneous operation and failure of the acceleration sensor arise.

From the above description, in the technology described in Patent Document 1, it can be found that while measures against vibration disturbance are easy, measures against temperature change are complex. That is, while the technology described in Patent Document 1 allows separation of vibration disturbance and the natural frequency to be easily performed, there is a scope for improvement, in view of inhibiting fluctuations of the natural frequency based on temperature change.

Thus, the technology described in Non-Patent Document 1 has been suggested. In the acceleration sensor described in Non-Patent Document 1, an open-ended mass body is supported at three points, with symmetrical-type support beams being provided at two points at an open end and with the mass body being connected on a center axis at the remaining one point.

According to the above-structured acceleration sensor, the spring constant of the support beam can be easily changed by adjusting the length of the support beam. Thus, the natural frequency defined by the mass of the mass body and the spring constant of the support beam can be easily adjusted. That is, also in a vibration system described in Non-Patent Document 1, the natural frequency can be easily shifted to a high frequency band, thereby easily separating vibration disturbance typified by 1/f noise and the natural frequency of the acceleration sensor.

Furthermore, according to the acceleration sensor described in Non-Patent Document 1, for example, when distortion occurs in the acceleration sensor due to, for example, temperature change, deformation of the open-ended mass body absorbs part of the distortion. Then, the remaining distortion is added as internal stress of the symmetrical-type support beams. Here, the symmetrical-type support beams are configured in a manner such that, when tensile stress is added to one support beam, compressive stress is added to another support beam. As a result, as the entire symmetrical-type support beams, tensile stress and compressive stress are cancelled out each other. Thus, as the entire symmetrical-type support beams, fluctuations of the spring constant are inhibited. That is, in the technology described in Non-Patent Document 1, fluctuations of the spring constant of the support beam due to distortion occurring by temperature change or the like can be inhibited by adoption of an open-ended mass body and adoption of symmetrical-type support beams. Therefore, since fluctuations of the spring constant can be inhibited in the technology described in Non-Patent Document 1, it can be found that fluctuations of the natural frequency of the vibration system due to temperature change can be inhibited.

From this, according to the technology described in Non-Patent Document 1, even if a temperature change occurs in a wide range, fluctuations of the natural frequency in the vibration system can be inhibited, and therefore high-level temperature characteristic correction by a signal processing circuit is not required. As a result, according to the technology described in Non-Patent Document 1, high reliability of the acceleration sensor, a decrease in size of the signal processing circuit, and simplification of temperature characteristic correction at the time of shipping of the acceleration sensor can be achieved, thereby decreasing cost of the acceleration sensor.

From the above description, it can be found that the technology described in Non-Patent Document 1 can easily take measures against vibration disturbance and can sufficiently support temperature change also. That is, the technology described in Non-Patent Document 1 can easily perform separation of vibration disturbance and the natural frequency and can sufficiently inhibit fluctuations of the natural frequency based on temperature change also.

However, by studying the technology described in Non-Patent Document 1, the inventor has found that there is a further scope for improvement in the acceleration sensor in the three-point supporting structure described in Non-Patent Document 1. That is, the technology described in Non-Patent Document 1 has a scope for improvement unique to the three-point supporting structure. This point will be described below.

In the acceleration sensor in the three-point supporting structure, in addition to a vibration mode of vibration at natural frequency in, for example, a first direction (X direction), there is also a mode due to rotation and torsion about a center axis. Here, in the specification, in the three-point supporting structure, the mode due to rotation and torsion about the center axis is referred to as an unwanted mode. That is, in the acceleration sensor in the three-point supporting structure, in addition to the vibration mode of vibration at natural frequency, there is also the unwanted mode due to rotation and torsion. In this case, in the acceleration sensor in the three-point supporting structure, there is a scope for improvement due to the presence of the unwanted mode.

Figure 3:
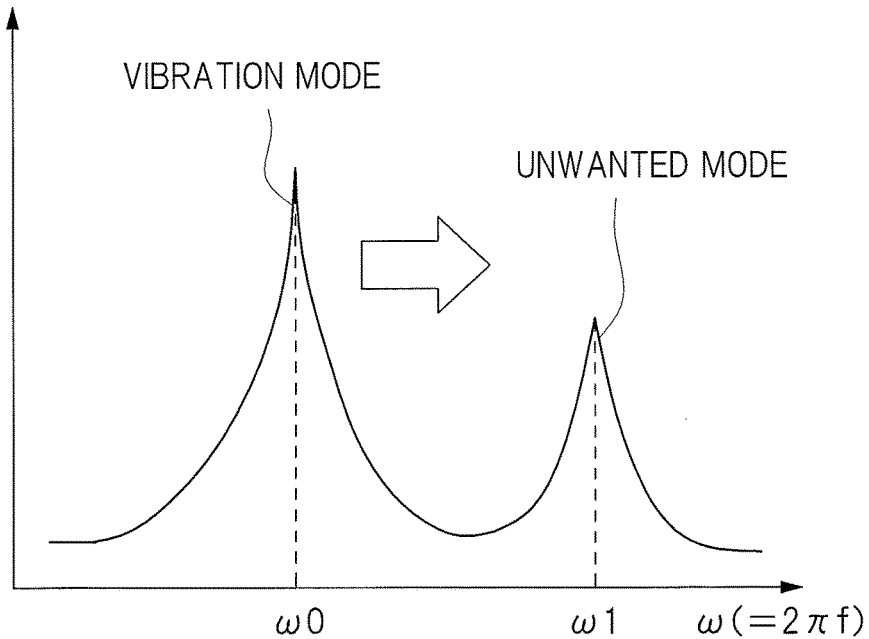
FIG. 3 is a graph illustrating frequency characteristics in an acceleration sensor in a three-point supporting structure.

FIG. 3 is a graph illustrating frequency characteristics in the acceleration sensor in the three-point supporting structure. In FIG. 3, the horizontal axis represents angular frequency ω of a vibration system configuring the acceleration sensor in the three-point supporting structure, and the vertical axis represents the magnitude of amplitude of the vibration system. As illustrated in FIG. 3, for example, in the vibration system configuring the acceleration sensor in the three-point supporting structure, a peak is present at an angular frequency ω0. This means that the vibration system configuring the acceleration sensor in the three-point supporting structure is prone to vibrate at the angular frequency ω0. This angular frequency ω0 corresponds to natural frequency, and the peak at the angular frequency ω0 is a peak corresponding to the vibration mode of vibration at natural frequency.

Furthermore, as illustrated in FIG. 3, in the acceleration sensor in the three-point supporting structure, there is also a peak at an angular rate ml. This peak at the angular frequency ω1 is a peak corresponding to the unwanted mode due to rotation and torsion. Therefore, in the acceleration sensor in the three-point supporting structure, it can be found that the vibration mode of vibration at natural frequency and also the unwanted mode due to rotation and torsion are present.

Here, in consideration of 1/f noise, also in the acceleration sensor in the three-point supporting structure, it is required to favorably separate the natural frequency of the vibration mode from noise corresponding to vibration distortion. From this, also in the acceleration sensor in the three-point supporting structure, it can be found that it is important to configure the acceleration sensor in the three-point supporting structure so that the natural frequency of the vibration mode is shifted to a high frequency band as much as possible.

Figure 4:
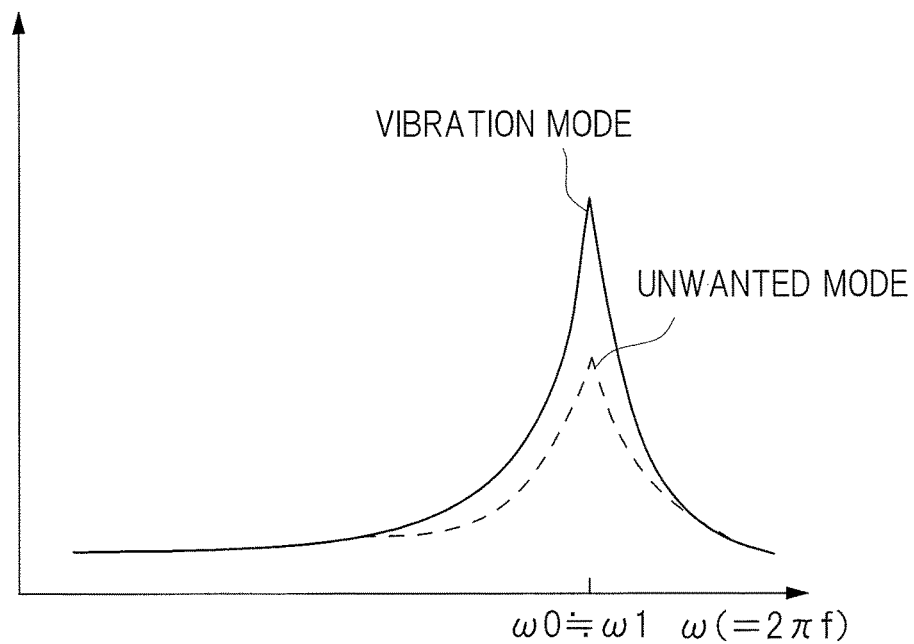
FIG. 4 is a graph illustrating an example in which natural frequency is shifted to a high frequency band in the acceleration sensor in the three-point supporting structure.

FIG. 4 is a graph illustrating an example in which the natural frequency of the vibration mode is shifted to a high frequency band in the acceleration sensor in the three-point supporting structure. As can be seen from FIG. 4, it can be found that as a result of shifting the natural frequency of the vibration mode to a high frequency band, for example, the natural frequency of the unwanted mode due to rotation and torsion and the natural frequency of the vibration mode overlap each other. In this case, since the vibration mode and the unwanted mode are mixed together, the possibility of occurrence of erroneous operation in the acceleration sensor is increased.

Figure 5:
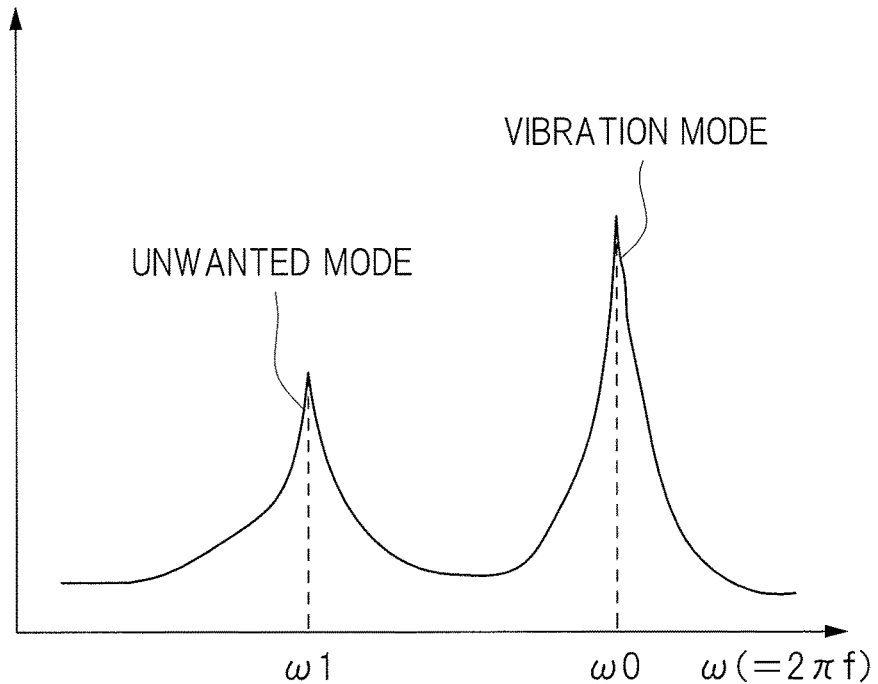
FIG. 5 is a graph illustrating another example in which natural frequency is shifted to a high frequency band in the acceleration sensor in the three-point supporting structure.

On the other hand, FIG. 5 is a graph illustrating another example in which the natural frequency of the vibration mode is shifted to a high frequency band in the acceleration sensor in the three-point supporting structure. As can be seen from FIG. 5, it can be found that as a result of shifting the natural frequency of the vibration mode to a high frequency band, the natural frequency of the vibration mode is positioned on a high frequency band side of the unwanted mode due to rotation and torsion without overlapping of the vibration mode and the unwanted mode. That is, as illustrated in FIG. 5, also in the acceleration sensor in the three-point supporting structure, it can be thought that vibration disturbance typified by 1/f noise and the natural frequency of the acceleration sensor can be easily separated by shifting the natural frequency of the vibration mode to a high frequency band so that the vibration mode and the unwanted mode do not overlap each other.

However, in the acceleration sensor in the three-point supporting structure, the unwanted mode due to rotation and torsion is present. Therefore, only shifting the natural frequency of the vibration mode to a high frequency band side so as not to overlap the unwanted mode is not enough because the natural frequency of the unwanted mode is still positioned in a low frequency band. In this case, if the natural frequency of the unwanted mode due to rotation and torsion is present in a low frequency band, the acceleration sensor is susceptible to influences of 1/f noise. As a result, noise corresponding to vibration disturbance resonates with the natural frequency of the unwanted mode, thereby increasing the possibility that the mass body exhibits undesired behavior typified by rotation and torsion, although no acceleration is externally applied. Therefore, when 1/f noise is taken into consideration as noise corresponding to vibration disturbance, it can be found that the natural frequency of the unwanted mode is also desirably shifted to a high frequency band with less 1/f noise. That is, in consideration of 1/f noise, it is required to favorably separate the unwanted mode of the acceleration sensor in the three-point supporting structure from noise corresponding to vibration disturbance, and it can be found that it is important to configure the acceleration sensor in the three-point supporting structure so that the natural frequency of the unwanted mode is shifted to a high frequency band as much as possible.

Thus, in the acceleration sensor in the first embodiment, it is presumed that the three-point supporting structure is adopted in view of being capable of easily performing separation of vibration disturbance and the natural frequency of the vibration mode and also sufficiently inhibiting fluctuations of the natural frequency based on temperature change. And, in the first embodiment, contrivance for solving a unique problem that is present in the acceleration sensor in the three-point supporting structure is provided. In the following, the acceleration sensor in the first embodiment provided with this contrivance will be described.

Basic Idea in First Embodiment

Figure 6:
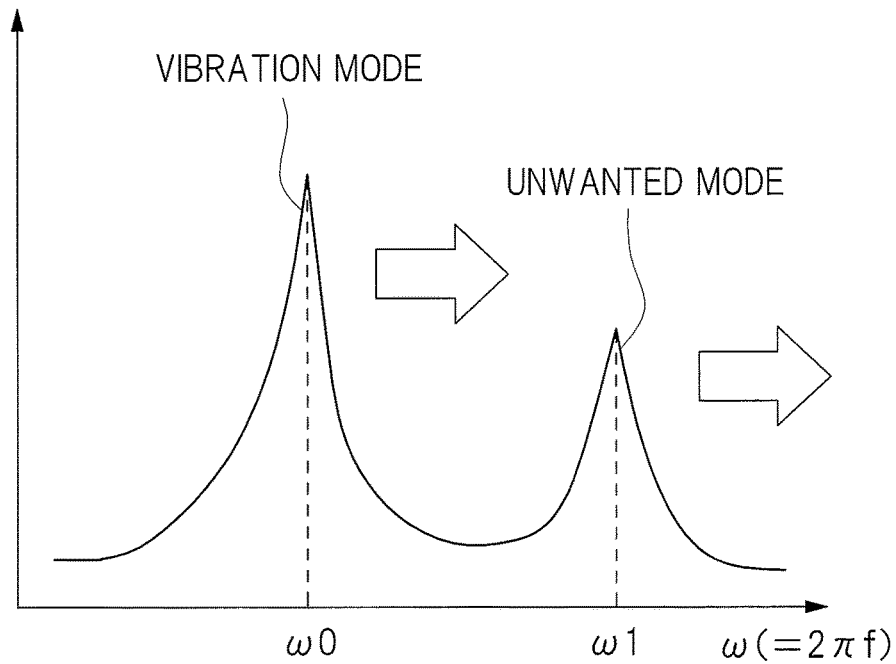
FIG. 6 is a graph illustrating a technical idea in which not only a vibration mode of vibration at natural frequency but also an unwanted mode due to rotation and torsion is shifted to a high frequency band side with less 1/f noise.

In the acceleration sensor in the three-point supporting structure, the vibration mode of vibration at natural frequency and also the unwanted mode due to rotation and torsion are present. From this, in the acceleration sensor in the three-point supporting structure, only shifting the natural frequency of the vibration mode to a high frequency band side is not enough, and it is required to adopt a structure in which the natural frequency of the unwanted mode due to rotation and torsion is also shifted to a high frequency band side. That is, in the first embodiment, for example, as illustrated in FIG. 6, when 1/f noise is taken into consideration as noise corresponding to vibration disturbance, a structure is taken as a basic idea, in which not only the natural frequency of the vibration mode but also the natural frequency of the unwanted mode due to rotation and torsion is shifted to a high frequency band side with less 1/f noise. In the following, the structure of the acceleration sensor in the three-point supporting structure which embodies this basic idea will be described.

Entire Structure of Accelerator Sensor in First Embodiment

Figure 7:
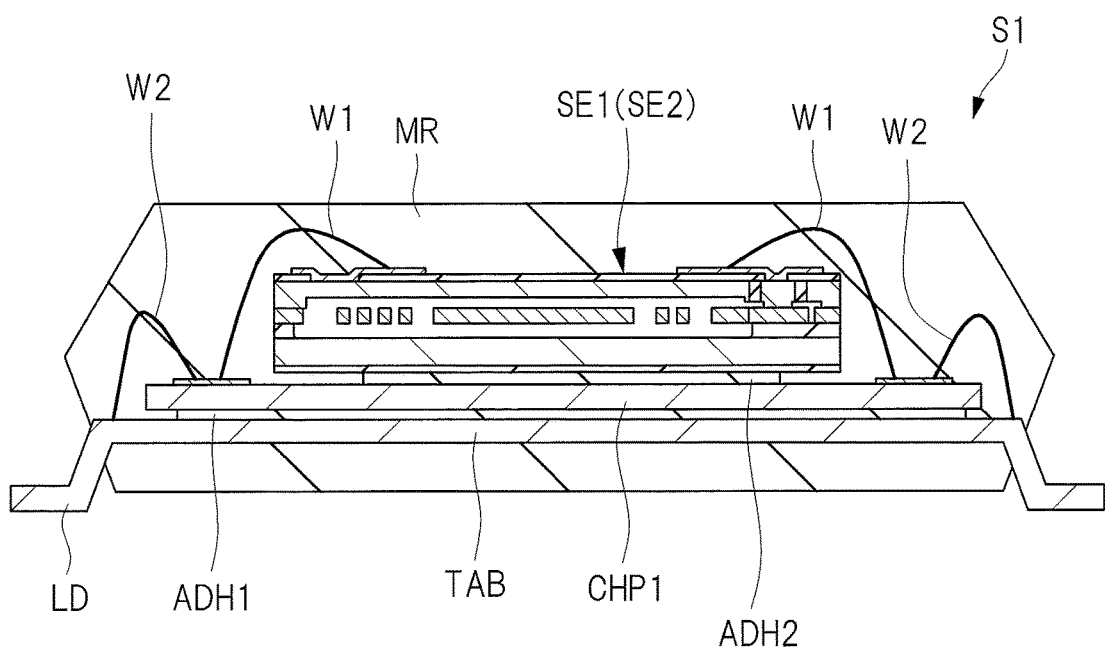
FIG. 7 is a sectional view illustrating an entire structure of the acceleration sensor in the first embodiment.

First, the entire structure of the acceleration sensor in the first embodiment is described with reference to the drawings. FIG. 7 is a sectional view illustrating the entire structure of an acceleration sensor S1 in the first embodiment. As illustrated in FIG. 7, the acceleration sensor S1 in the first embodiment has a semiconductor chip CHP1 on a chip mounting portion TAB integrally formed with a lead LD via an adhesive material ADH1. And, on this semiconductor chip CHP1, a sensor element SE1 is mounted via an adhesive material ADH2.

Here, in the semiconductor chip CHP1, for example, an integrated circuit configured of a semiconductor element typified by a MISFET (Metal Insulator Semiconductor Field Effect Transistor) or the like and multilayered wires is formed. On the other hand, in the sensor element SE1, for example, an acceleration sensor structure having a three-point supporting structure is formed by using semiconductor micromachining technology. That is, in the acceleration sensor S1 in the first embodiment has the semiconductor chip CHP1 with an integrated circuit formed thereon and the sensor element SE1 having a structure with a three-point supporting structure formed therein. With the semiconductor chip CHP1 and the sensor element SE1 electrically connected, the acceleration sensor S1 in the three-point supporting structure is configured.

Therefore, for example, the sensor element SE1 and the semiconductor chip CHP1 are electrically connected via, for example, a wire W1 formed of a metal wire, and the semiconductor chip CHP1 and the lead LD are electrically connected via, for example, a wire W2 formed of a metal wire.

With this, in the structure in the three-point supporting structure formed in the sensor element SE1, displacement of a mass body corresponding to acceleration occurs, and this displacement of the mass body is captured at an acceleration detecting portion provided in the sensor element SE1 as a change in electric capacity. And, the change in electric capacity detected at the acceleration detecting portion in the sensor element SE1 is outputted to the semiconductor chip CHP1 electrically connected via the wire W1 to the sensor element SE1, and is subjected to signal processing at a signal processing circuit formed in the semiconductor chip CHP1. Then, an acceleration signal is outputted to the lead LD electrically connected via the wire W2 to the semiconductor chip CHP1.

Furthermore, in the acceleration sensor S1 in the first embodiment, part of the sensor element SE1, the semiconductor chip CHP1, the wire W1, the wire W2, and the lead LD are sealed with resin MR made of thermosetting resin. The above-configured acceleration sensor S1 in the first embodiment is configured to, for example, be incorporated in a higher-level system to supply the detected acceleration signal to the higher-level system.

Sectional Structure of Sensor Element in First Embodiment

Figure 8:
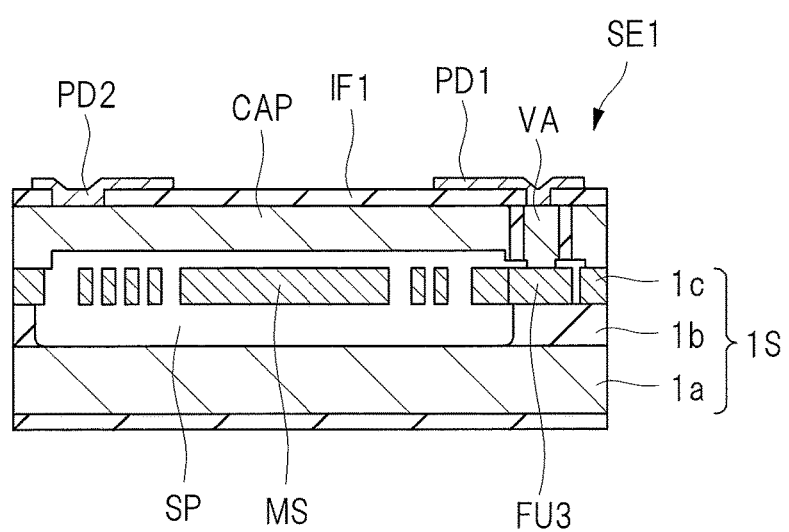
FIG. 8 is a schematic view illustrating a sectional structure of a sensor element in the first embodiment.

Subsequently, the sectional structure of the sensor element SE1 in the first embodiment is described. FIG. 8 is a schematic view illustrating the sectional structure of the sensor element SE1 in the first embodiment. In FIG. 8, for the sensor element SE1 in the first embodiment, in order to form mechanical components such as a mass body, fixing portions, and beams, which will be described further below, for example, a substrate 1S having a conductive layer 1c laminated on a support substrate 1a equipped with an insulating layer 1b is used. That is, as illustrated in FIG. 8, in the substrate 1S, the insulating layer 1b is formed on the support substrate 1a, and the conductive layer 1c is formed on this insulating layer 1b. The support substrate 1a is formed of, for example, silicon (Si), and the insulating layer 1b is formed of, for example, silicon oxide ($SiO_2$). Furthermore, the conductive layer 1c formed on the insulating layer 1b is formed of, for example, conductive silicon.

A total thickness of the support substrate 1a and the insulating layer 1b is, for example, several tens of μm to several hundreds of μm, and the conductive layer 1c has a thickness of, for example, several of μm to several tens of μm. In the first embodiment, for example, the substrate 1S in which conductive silicon as the conductive layer 1c is laminated to the silicon substrate (support substrate 1a) having the silicon oxide film (insulating layer 1b) formed thereon is used. However, the substrate 1S is not restricted to this, and can be variously changed. For example, conductive polysilicon using surface MEMS technology or, for example, plating metal such as nickel (Ni), may be used as the conductive layer 1c.

Each component of the sensor element SE1 in the first embodiment is formed of processing the support substrate 1a, the insulating layer 1b, and the conductive layer 1c. Specifically, first, after a resist film reactive to light or electron beams is applied onto the insulating layer 1b, the resist film on the insulating layer 1b other than a portion to be connected to a fixing portion typified by a fixing portion FU3 is removed by using photolithography technology or electron beam lithography technology.

Next, the insulating layer 1b is removed by putting dry etching technology using RIE (Reactive Ion Etching) technology or wet etching technology using hydrofluoric acid to full use. Furthermore, as required, part of the exposed support substrate 1a is also removed by dry etching technology using RIE technology or wet etching technology using an alkaline chemical agent such as TMAH or KOH. With this, a space SP illustrated in FIG. 8 can be formed.

Subsequently, after the resist film formed on the insulating layer 1b is removed, the conductive layer 1c is joined onto the insulating layer 1b by using high temperature joint technology, surface-activated joint technology, or the like. By using photolithography technology and etching technology on this conductive layer 1c, mechanical components of the sensor element SE1 such as the mass body MS, the fixing portion FU3, and the beams can be formed.

While the space SP is provided so that the mass body MS can be displaced, the space SP is provided so as to prevent the mass body MS from being attached to the support substrate 1a by static electricity or the like and also to function as a stopper which prevents the mass body MS from being displaced by an impact or the like to override another component on the same conductive layer 1c as for the fixing portion FU3 and others. Furthermore, when the mechanical components such as the mass body MS configuring the sensor element SE1 are hermetically sealed into a vacuum state, by providing the space SP, the volume of an airtight space formed by the support substrate 1a and a cap CAP can be increased. Thus, even if weak gaseous molecules from outside are leaked, even if outgas occurring due to an organic matter inside the airtight space or some chemical reaction is present for a long period of time, or even if a free path distance of air molecules inside the airtight space due to change in environment temperature is changed, their influences can be reduced. As a result, according to the first embodiment, the acceleration sensor S1 excellent in long-term reliability and resistance to temperature change can be provided.

In the cap CAP, for example, as illustrated in FIG. 8, a through hole reaching the fixing portion FU3 is provided. In this through hole, a conductive material is buried via an insulating film IF1 to form a via (through electrode) VA. As illustrated in FIG. 8, this via VA is formed so as to electrically isolate part of the cap CAP by the insulating film IF1 and to penetrate through the cap CAP. And, a pad PD1 electrically connected to the via VA is formed over the insulating film IF1 of the cap CAP. To this pad PD1, for example, the wire W1 illustrated in FIG. 7 is connected. On the other hand, a pad PD2 has a function of fixing the potential of a conductive region of the cap CAP other than a region to be used for the via VA at a certain value, and is fixed at a certain voltage present inside the semiconductor chip where the signal processing circuit is formed. With this, electromagnetic noise from outside can be inhibited from adversely affecting the acceleration sensor.

Note that in place of the substrate 1S used for the sensor element SE1 in the first embodiment, a SOT (Silicon On Insulator) substrate having a three-layer structure of silicon, silicon oxide, and silicon in advance may be used. In this case, the insulating layer 1b is removed after the conductive layer 1c is processed.

Planar Structure of Sensor Element in First Embodiment

Figure 9:
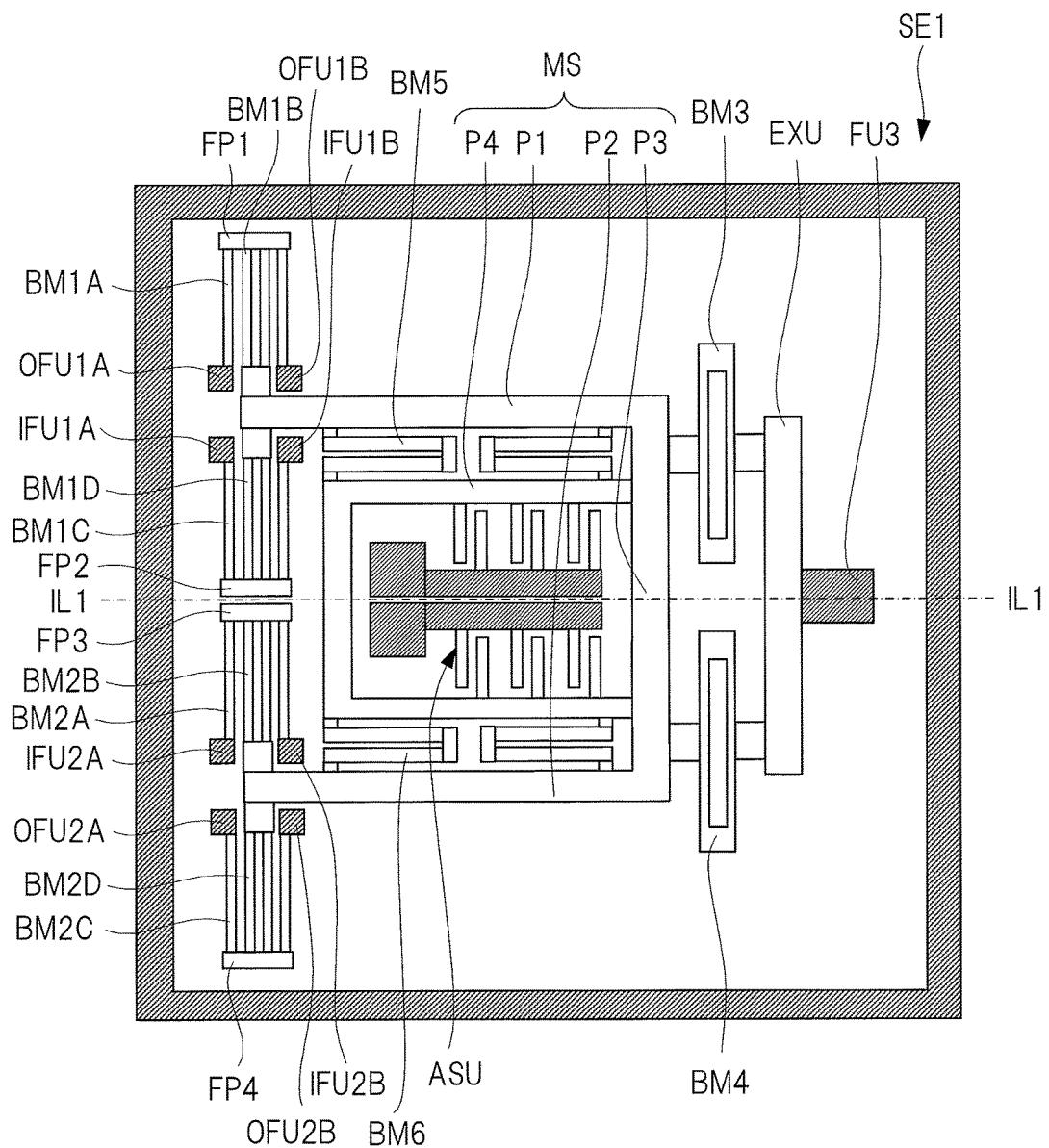
FIG. 9 is a diagram illustrating a planar structure of the sensor element in the first embodiment.

Subsequently, a planar structure of the sensor element SE1 in the first embodiment is described with reference to the drawings. FIG. 9 is a drawing illustrating a planar structure of the sensor element SE1 in the first embodiment. In the following, a direction extending in a lateral direction in the drawing is defined as an X direction (first direction), and a direction extending in a longitudinal direction in the drawing is defined as a Y direction. Furthermore, a direction perpendicular to both of the X direction and the Y direction (a direction perpendicular to the paper surface) is defined as a Z direction.

In the sensor element SE1 in the first embodiment, one vibration system is formed by the mass body MS, support beams BM1A to BM1D, support beams BM2A to BM2D, a support beam BM3, and a support beam BM4.

The mass body MS is flexible in the X direction as the first direction and is supported in the Y direction as the second direction orthogonal to the first direction via the rigid support beams BM1A to BM1D, support beams BM2A to BM2D, support beam BM3, and support beam BM4.

In FIG. 9, the sensor element SE1 in the first embodiment has the mass body MS displaceable in the X direction. This mass body MS is configured to include a first region P1 elongated in the X direction, a second region P2 elongated in the X direction, and a third region P3 extending in the Y direction so as to couple these first region P1 and second region P2. Thus, the mass body MS has a shape with one side open. Here, the third region P3 extending in the Y direction may extend in the Y direction orthogonal to the X direction, but is not necessarily required to be parallel to the Y direction as long as the third region couples the first region P1 and the second region P2. Furthermore, the third portion P3 is configured to be rigid in both of the X direction and the Y direction. With this, the natural frequency of the vibration system vibrating in the X direction can be increased.

The first region P1 is configured to extend in the X direction, and the second region P2 is configured to extend in the X direction as being a predetermined distance away from the first region P1 in the Y direction orthogonal to the X direction. And, the third region P3 is configured to extend in the Y direction so as to be coupled to the first region P1 and the second region P2.

For example, the first region P1 and the second region P2 are disposed symmetrically with respect to a virtual line IL1 passing through the center in the Y direction, and the third region P3 is disposed so as to connect these first region P1 and second region P2. And, a fourth region P4 is disposed so as to be contained in a shape configured by the first region P1, the second region P2, and the third region P3. This fourth region P4 is connected to the first region P1 via a fixing beam BM5 and is connected to the second region P2 via a fixing beam BM6.

Near an end of the first region P1, an outer fixing portion OFU1A and an outer fixing portion OFU1B are disposed, and an inner fixing portion IFU1A and an inner fixing portion IFU1B are also disposed. In particular, the outer fixing portion OFU1A, the outer fixing portion OFU1B, the inner fixing portion IFU1A, and the inner fixing portion IFU1B are disposed on the same side with respect to the virtual line IL1. Furthermore, the outer fixing portion OFU1A and the inner fixing portion IFU1A are disposed symmetrically with respect to the first region P1, and the outer fixing portion OFU1B and the inner fixing portion IFU1B are also disposed symmetrically with respect to the first region P1.

And, a free end FP1 is provided outside the first region P1. The first region P1 and the free end FP1 are connected via the support beam BM1B extending in the Y direction, and the free end FP1 and the outer fixing portion OFU1A are connected via the support beam BM1A extending in the Y direction. Therefore, the first region P1 and the outer fixing portion OFU1A are connected via the support beam BM1A and the support beam BM1B connected to the free end FP1. Similarly, the first region P1 and the free end FP1 are connected via the support beam BM1B extending in the Y direction, and the free end FP1 and the outer fixing portion OFU1B are connected via the support beam BM1A extending in the Y direction. Therefore, the first region P1 and the outer fixing portion OFU1B are also connected via the support beam BM1A and the support beam BM1B connected to the free end FP1.

Furthermore, a free end FP2 is provided inside the first region P1. The first region P1 and the free end FP2 are connected via the support beam BM1D extending in the Y direction, and the free end FP2 and the inner fixing portion IFU1A are connected via the support beam BM1C extending in the Y direction. Therefore, the first region P1 and the inner fixing portion IFU1A are connected via the support beam BM1C and the support beam BM1D connected to the free end FP2. Similarly, the first region P1 and the free end FP2 are connected via the support beam BM1D extending in the Y direction, and the free end FP2 and the inner fixing portion IFU1B are connected via the support beam BM1C extending in the Y direction. Therefore, the first region P1 and the inner fixing portion IFU1B are also connected via the support beam BM1C and the support beam BM1D connected to the free end FP2.

Also, a free end FP3 is provided inside the second region P2. The second region P2 and the free end FP3 are connected via the support beam BM2B extending in the Y direction, and the free end FP3 and the inner fixing portion IFU2A are connected via the support beam BM2A extending in the Y direction. Therefore, the second region P2 and the inner fixing portion IFU2A are connected via the support beam BM2A and the support beam BM2B connected to the free end FP3. Similarly, the second region P2 and the free end FP3 are connected via the support beam BM2B extending in the Y direction, and the free end FP3 and the inner fixing portion IFU2B are connected via the support beam BM2A extending in the Y direction. Therefore, the second region P2 and the inner fixing portion IFU2B are also connected via the support beam BM2A and the support beam BM2B connected to the free end FP3.

Furthermore, a free end FP4 is provided outside the second region P2. The second region P2 and the free end FP4 are connected via the support beam BM2D extending in the Y direction, and the free end FP4 and the outer fixing portion OFU2A are connected via the support beam BM2C extending in the Y direction. Therefore, the second region P2 and the outer fixing portion OFU2A are connected via the support beam BM2C and the support beam BM2D connected to the free end FP4. Similarly, the second region P2 and the free end FP4 are connected via the support beam BM2D extending in the Y direction, and the free end FP4 and the outer fixing portion OFU2B are connected via the support beam BM2C extending in the Y direction. Therefore, the second region P2 and the outer fixing portion OFU2B are also connected via the support beam BM2C and the support beam BM2D connected to the free end FP4.

Next, in the sensor element SE1 in the first embodiment, as illustrated in FIG. 9, the fixing portion FU3 is provided on the virtual line IL1 passing through the center in the Y direction. To this fixing portion FU3, an extending portion EXU extending in the Y direction is connected. This extending portion EXU is elongated in the Y direction, and has a width in the X direction sufficiently large compared with the other support beams BM1A to BM1D, support beams BM2A to BM2D, support beam BM3, and support beam BM4. Thus, the extending portion EXU is difficult to move in any of directions including the X direction and the Y direction.

And, the third region P3 configuring part of the mass body MS and the extending portion EXU are connected via the support beam BM3, and are connected via the support beam BM4. Here, the support beam BM3 and the support beam BM4 are disposed oppositely with respect to the virtual line IL1. For example, the support beam BM3 and the support beam BM4 are disposed symmetrically with respect to the virtual line IL1.

Furthermore, in the sensor element SE1 in the first embodiment, as illustrated in FIG. 9, the mass body MS includes the fourth region P4 in addition to the first region P1 to the third region P3. While being connected to the third region P3, this fourth region P4 is connected to the first region P1 elongated in the X direction via the fixing beam BM5 that is rigid in the X direction and soft in the Y direction. Similarly, the fourth region P4 is connected to the second region P2 elongated in the X direction via the fixing beam BM6 that is rigid in the X direction and soft in the Y direction. And, an acceleration detecting portion ASU is formed so as to be contained in the fourth region P4 configuring part of the mass body MS.

Specifically, this acceleration detecting portion ASU is configured to include a variable electrode for detection integrally formed with the fourth region P4 and a fixed electrode for detection fixed to a fixing member. In this case, when acceleration is externally applied in the X direction, the mass body MS is displaced in the X direction. Therefore, the fourth region P4 configuring part of the mass body MS is also displaced in the X direction, and the movable electrode for detection integrally formed with the fourth region P4 is also displaced in the X direction.

On the other hand, because of being connected to the fixing member, the fixed electrode for detection is not displaced even if acceleration is applied. Thus, a distance between the movable electrode for detection and the fixed electrode for detection is changed. This means that electrostatic capacity (electric capacity) of an electrostatic capacity element configured of the movable electrode for detection and the fixed electrode for detection is changed. As such, the acceleration detecting portion ASU is configured to capture displacement of the mass body MS as a change in electrostatic capacity.

This acceleration detecting portion ASU can be configured to include, for example, a capacitive element with increased electrostatic capacity and a capacitive element with decreased electrostatic capacity with respect to displacement of the mass body MS in a +X direction, thereby achieving differential direction. As an advantage of differential direction, influences of unevenness of initial capacity due to an error in a capacitive element can be reduced, for example.

Features in First Embodiment

The sensor element SE1 in the first embodiment is configured as described above, and its feature points are described below. A first feature point in the first embodiment is, for example, as illustrated in FIG. 9, that the extending portion EXU is provided so as to connect to the fixing portion FU3, this extending portion EXU and the third region P3 which configures part of the mass body MS are connected via the support beam BM3 and the support beam BM4, and the support beam BM3 and the support beam BM4 are disposed oppositely to each other with respect to the virtual line TL1.

With this, the occurrence of rotation and torsion of the mass body MS with the virtual line IL1 as a center line can be inhibited. That is, in the first embodiment, the extending portion EXU and the third region P3 are configured so as to be connected via two support beams BM3 and BM4, and the support beam BM3 and the support beam BM4 are disposed oppositely to each other with respect to the virtual line IL1, thereby causing rotation and torsion of the mass body MS to be less prone to occur about the virtual line IL1. This means an increase of rotational stiffness (difficulty in rotation) of the mass body MS. In other words, according to the first embodiment, this means that the natural frequency of the unwanted mode due to rotation and torsion of the mass body MS can be shifted to a high frequency band.

In general, when it is assumed that the spring constant is k, the mass of the displaceable mass body is m, and the natural frequency is f, angular frequency $\omega = 2\pi f = \sqrt{(k/m)}$ (Equation 1). From this equation (1), the natural frequency of the unwanted mode due to rotation and torsion can be found. When the equation (1) is applied to this unwanted mode, rotational stiffness (difficulty in rotation) corresponds to the spring constant k, and inertial moment about the virtual line IL1 corresponds to the mass m. Here, according to the first embodiment, as illustrated in FIG. 9, the first feature point is adopted, in which the extending portion EXU is provided so as to connect to the fixing portion FU3, this extending portion EXU and the third region P3 which configures part of the mass body MS are connected via the support beam BM3 and the support beam BM4, and the support beam BM3 and the support beam BM4 are disposed oppositely to each other with respect to the virtual line IL1. When the structure of this first feature point and the structure in which the fixing portion FU3 and the third region P3 are supported by one support beam disposed on the virtual line IL1 are compared with each other, while the structures have the same inertial moment, rotational stiffness (difficulty in rotation) of the structure in the first embodiment is higher. This means that the spring constant k corresponding to rotational stiffness (difficulty in rotation) is increased in the equation (1). Therefore, from the equation (1), when the spring constant k is increased, the natural frequency of the unwanted mode is increased.

From the above description, according to the first embodiment, the natural frequency of the unwanted mode due to rotation and torsion of the mass body MS can be shifted to a high frequency band. That is, according to the first embodiment, with the above-described first feature point, the natural frequency of the unwanted mode due to rotation and torsion of the mass body MS can be shifted to a high frequency band with less 1/f noise. Thus, the natural frequency of the unwanted mode resonates with noise corresponding to vibration disturbance and, it is possible to reduce the possibility that the mass body exhibits undesired behavior typified by rotation and torsion although no acceleration is externally applied.

On one hand, in the sensor element SE1 in the first embodiment illustrated in FIG. 9, the outer fixing portions OFU1A and OFU1B and the inner fixing portions IFU1A and IFU1B connected to the first region P1 are considered as one integral fixing portion, and the outer fixing portions OFU2A and OFU2B and the inner fixing portions IFU2A and IFU2B connected to the second region P2 are considered as one integral fixing portion. Then, the sensor element SE1 in the first embodiment illustrated in FIG. 9 has a three-point supporting structure by the above-described two fixing portions and the fixing portion FU3. That is, it can be found that the sensor element SE1 in the first embodiment basically has the three-point structure in which the mass body MS is supported by three fixing portions. Therefore, as with the acceleration sensor in the three-point supporting structure described in the Non-Patent Document 1, the sensor element SE1 in the first embodiment also can easily perform separation of vibration disturbance and the natural frequency of the vibration system and can sufficiently inhibit fluctuations of the natural frequency based on temperature change. That is, also in the sensor element SE1 in the first embodiment, the natural frequency of the vibration system in which the mass body MS vibrates in the X direction can be easily shifted to a high frequency band.

On the other hand, in the sensor element SE1 in the first embodiment, unlike the acceleration sensor described in Non-Patent Document 1, the fixing portion FU3 and the third region P3 are not supported by one support beam disposed on the virtual line IL1. Specifically, in the sensor element SE1 in the first embodiment, for example, as illustrated in FIG. 9, the extending portion EXU is provided so as to connect to the fixing portion FU3, this extending portion EXU and the third region P3 which configures part of the mass body MS are connected via the support beam BM3 and the support beam BM4, and the support beam BM3 and the support beam BM4 are disposed oppositely to each other with respect to the virtual line IL1.

Here, when the support beams BM1A to BM1D are considered as one support beam and the support beams BM2A to BM2D are considered as one support beam, the mass body MS in the first embodiment is connected via the above-described two support beams, the support beam BM3, and the support beam BM4. That is, in the first embodiment, a structure is adopted in which, while the three-point supporting structure is basically adopted in which the mass body MS is supported by the three fixing portions, the mass body MS is suspended by four support beams. As a result, according to the sensor element SE1 in the first embodiment, not only the natural frequency of the vibration mode in which the mass body MS vibrates in the X direction but also the natural frequency of the unwanted mode due to rotation and torsion can be shifted to a high frequency band side with less 1/f noise.

With this, in the sensor element SE1 in the first embodiment, not only in the vibration mode in which the mass body MS vibrates in the X direction but also in the unwanted mode due to rotation and torsion, it is possible to provide the acceleration sensor S1 capable of easily performing separation of vibration disturbance and the natural frequency and also capable of sufficiently inhibiting fluctuations of the natural frequency based on temperature change. That is, according to the acceleration sensor S1 in the first embodiment, it is possible to provide the acceleration sensor S1 that is not susceptible to (is robust against) temperature change and vibration disturbance in the implementation environment of the acceleration sensor S1.

Note that, in the first embodiment, of the vibration system configured of the mass body MS, the support beams BM1A to BM1D, the support beams BM2A to BM2D, the support beam BM3 and the support beam BM4, a mode with the lowest frequency is the vibration mode in which the mass body MS vibrates in the X direction.

As described above, in the sensor element SE1 in the first embodiment, fluctuations of the natural frequency based on temperature change can also be sufficiently inhibited, and this feature point is described.

The acceleration sensor S1 in the first embodiment is configured, for example, as illustrated in FIG. 7, to have materials of different types multilayered, such as the semiconductor chip CHP1, the adhesive materials ADH1 and ADH2, the lead LD, and the sensor element SE1. Also, the above-described components including the sensor element SE1 and the semiconductor chip CHP1 are sealed with the resin MR. That is, the acceleration sensor S1 in the first embodiment is configured as a multilayered structure of a plurality of materials with different coefficients of linear expansion. When the acceleration sensor S1 having this multilayered structure is used in, for example, a place with harsh temperature change such as a vehicle engine room, the sensor element SE1 is deformed due to a difference in the coefficient of linear expansion among the respective component materials, and the positions of the outer fixing portions OFU1A to OFU2B, the inner fixing portions IFU1A to IFU2B, and the fixing portion FU3 fluctuate.

According to the theory of strength of materials, by the temperature change and the difference in the coefficient of linear expansion, the sensor element SE1 is deformed so as to have a uniform curvature. Thus, any of the outer fixing portions OFU1A to OFU2B, the inner fixing portions IFU1A to IFU2B, and the fixing portion FU3 connected to the support beams BM1A to BM1D, the support beams BM2A to BM2D, the support beam BM3, and the support beam BM4 moves in a direction radially away from or closer to the center of the sensor element SE1.

Figure 10:
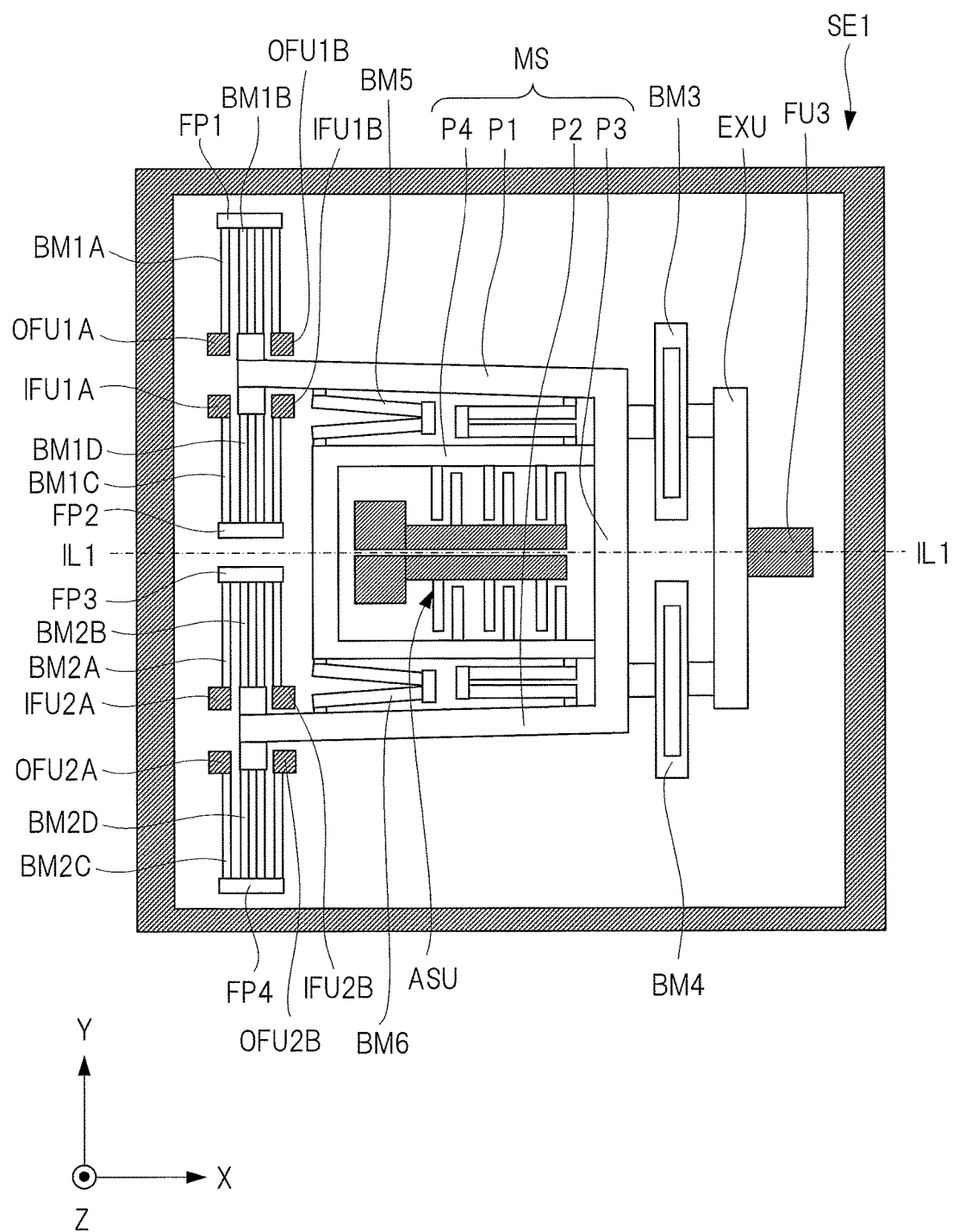
FIG. 10 is a diagram illustrating a state in which deformation occurs in a first region and a second region which configures part of a mass body due to substrate distortion.

As a result, as illustrated in FIG. 10, according to the sensor element SE1 in the first embodiment, deformation occurs also in the first region P1 and the second region P2 which configure part of the mass body MS. In this case, in the first embodiment, by configuring the mass body MS so as to include the first region P1 to have an open end, the second region P2, and the third region P3, part of substrate distortion is converted and absorbed to deformation of the first region P1 and the second region P2 which configure part of the mass body. Thus, according to the first embodiment, only substrate distortion not absorbed by the first region P1 and the second region P2 is applied to the support beams BM1A to BM1D and the support beams BM2A to BM2D, thereby reducing influences of substrate distortion.

That is, a second feature point in the first embodiment is that the mass body MS is configured in an open-end shape including the first region P1, the second region P2, and the third region P3 and part of substrate distortion occurring due to temperature change is absorbed by deformation of the first region P1 and the second region P2. That is, in the first embodiment, the second feature point is that part of substrate distortion is absorbed by deformation of the mass body MS by contriving the shape of the mass body MS. With this, according to the first embodiment, influences of substrate distortion based on temperature change can be reduced.

For example, when substrate distortion is increased, large internal stress occurs in the support beams BM1A to BM1D and the support beams BM2A to BM2D, thereby changing the spring constant of the support beams BM1A to BM1D and the support beams BM2A to BM2D. The change of the spring constant means that the natural frequency is changed, as can be seen from the above description-described (Equation 1). That is, when substrate distortion based on temperature change is applied to the support beams BM1A to BM1D and the support beams BM2A to BM2D, the natural frequency is changed.

This means that the natural frequency is changed due to temperature change even if, for example, the shape and dimensions of the support beams BM1A to BM1D and the support beams BM2A to BM2D are adjusted to increase the spring constant to shift the natural frequency to a high frequency band to separate vibration disturbance typified by 1/f noise from the natural frequency of the acceleration sensor. From this, when vibration disturbance is present in a frequency band adjacent to the natural frequency, it can be thought that the natural frequency and vibration disturbance may match each other at a specific temperature. In this case, concerns of erroneous operation and failure of the acceleration sensor arise.

Regarding this point, according to the first embodiment, with the above-described second feature point, part of substrate distortion is absorbed by deformation of the mass body MS. This means that only substrate distortion not absorbed by the first region P1 and the second region P2 is applied to the support beams BM1A to BM1D and the support beams BM2A to BM2D, thereby reducing influences of substrate distortion. That is, according to the first embodiment, internal stress occurring in the support beams BM1A to BM1D and the support beams BM2A to BM2D due to substrate distortion can be reduced. From this, according to the first embodiment, matching the natural frequency and vibration disturbance by a change of the natural frequency due to temperature change can be reduced. With this, erroneous operation and failure of the acceleration sensor S1 can be effectively inhibited, and reliability of the acceleration sensor S1 can be improved.

Note that, for example, movement of the fixing portion FU3 due to substrate distortion can also be thought. However, the fixing portion FU3 is disposed on the virtual line IL1 passing through the center of the sensor element SE1 in the Y direction. Therefore, movement of the fixing portion FU3 in the Y direction is negligible. Also, regarding movement of the fixing portion FU3 in the X direction, since the support beams BM1A to BM1D, the support beams BM2A to BM2D, the support beam BM3, and the support beam BM4 are configured to be soft in the X direction, movement of the fixing portion FU3 in the X direction is absorbed as deformation of the support beams BM1A to BM1D, the support beams BM2A to BM2D, the support beam BM3, and the support beam BM4 in the X direction, and influences on performance of the acceleration sensor S1 such as the spring constant of the support beams BM1A to BM1D, the support beams BM2A to BM2D, the support beam BM3, and the support beam BM4 are negligible.

For example, the support beam BM3 and the support beam BM4 are connected to the extending portion EXU extending in the Y direction from the fixing portion FU3 disposed on the virtual line IL1 passing through the center of the sensor element SE1 in the Y direction. And, the support beam BM3 and the support beam BM4 support the third region P3 configuring part of the mass body MS at two points away from the virtual line IL1. Thus, for the fixing portion FU3, even if substrate distortion occurs due to environment temperature change, movement of the fixing portion FU3 is at a negligible degree, and the extending portion EXU and the support beams BM3 and BM4 supported by this fixing portion FU3 are hardly influenced.

Furthermore, in the sensor element SE1 in the first embodiment, the mass body MS also includes the fourth region P4 in addition to the first region P1 to the third region P3. While being connected to the third region P3, this fourth region P4 is connected to the first region P1 elongated in the X direction via the fixing beam BM5 that is rigid in the X direction and soft in the Y direction. Similarly, the fourth region P4 is connected to the second region P2 elongated in the X direction via the fixing beam BM6 that is rigid in the X direction and soft in the Y direction. With this, for example, as illustrated in FIG. 10, even if the first region P1 and the second region P2 which configure part of the mass body MS is deformed by substrate distortion, this deformation is absorbed by the support beam BM5 and the support beam BM6. Thus, the fourth region P4 is less susceptible to substrate distortion, and the acceleration detecting portion ASU integrally formed with the fourth region P4 is also less susceptible to substrate distortion. Furthermore, while being firmly fixed by the third region P3, the fourth region P4 is fixed to the first region P1 and the second region P2 via the support beam BM5 and the support beam BM6 that are soft only in the Y direction. Therefore, while influences of substrate distortion are effectively shut off, displacement of the mass body MS in the X direction can be reliably transmitted to the acceleration detecting portion ASU. That is, according to the first embodiment, by configuring the mass body MS with the first region P1 to the fourth region P4, displacement of the mass body MS in the X direction due to application of acceleration can be reliably transmitted to the acceleration detecting portion ASU while part of substrate distortion is absorbed. Therefore, while reliability of the acceleration sensor S1 is improved, detection accuracy of the acceleration sensor S1 can be kept.

As described above, according to the sensor element SE1 in the first embodiment, with the second feature point, part of substrate distortion is absorbed by deformation of the mass body MS. Therefore, internal stress occurring in the support beams BM1A to BM1D and the support beams BM2A to BM2D due to substrate distortion can be reduced. However, substrate distortion not absorbed by the first region P1 and the second region P2 which configure part of the mass body MS is applied to the support beams BM1A to BM1D and the support beams BM2A to BM2D. Thus, the first embodiment has a third feature point of inhibiting a change of the spring constant of the support beams BM1A to BM1D and the support beams BM2A to BM2D due to substrate distortion. In the following, this third feature point is described. Note that since the support beams BM1A to BM1D and the support beams BM2A to BM2D have a similar structure, description is made by paying attention to the support beams BM1A to BM1D.

A spring constant k of the support beams BM1A to BM1D in the X direction is a function of the shape of the support beams BM1A to BM1D, a Young's modulus of a structure material, or the like. The Young's modulus of the structure material is a physical value unique to the structure material, but an apparent value is changed depending on the internal stress of the structure material. Therefore, in view of inhibiting fluctuations of the spring constant k of the support beams BM1A to BM1D in the X direction, it is required to contrive the internal stress of the support beams BM1A to BM1D occurring due to substrate distortion.

Here, a particularly important point is that what influences the spring constant k in the X direction is internal stress of the support beams BM1A to BM1D in the Y direction. For example, when the fixing portion radially moves with respect to a center portion of the sensor element SE1, it can be thought that movement components of the fixing portion in the X direction are absorbed by deformation of the support beams BM1A to BM1D and do not become a cause of occurrence of internal stress. On the other hand, as for movement components of the fixing portion in the Y direction, part of deformation not absorbed by the first region P1 and the second region P2 which configure part of the mass body MS acts so as to extend or compress the support beams BM1A to BM1D in the Y direction and, therefore, tensile stress or compressive stress occurs in the Y direction in the support beams BM1A to BM1D formed so as to be rigid in the Y direction. In particular, the internal stress in the Y direction influences the spring constant k of the support beams BM1A to BM1D in the X direction. Therefore, as can be seen with reference to (Equation 1), when internal stress in the Y direction occurs in the support beams BM1A to BM1D, fluctuations of the natural frequency of the vibration system configured of the mass body MS, the support beams BM1A to BM1D, the support beams BM2A to BM2D, the support beam BM3, and the support beam BM4 occur. Furthermore, when sensitivity of the sensor element SE1 is taken as Sa, Sa=x/a=1/(ω)² (Equation 2). Here, x indicates displacement of the vibration system in the X direction, and 'a' indicates applied acceleration. Also, ω indicates natural frequency of the vibration system in the X direction.

As represented in this (Equation 2), the sensitivity Sa of the sensor element SE1 is a function of natural frequency. Therefore, for example, when the natural frequency of the vibration system fluctuates, the sensitivity Sa of the sensor element SE1 also fluctuates. That is, it can be found that when internal stress in the Y direction occurs in the support beams BM1A to BM1D, fluctuations of the natural frequency of the vibration system occur, which also influences the sensitivity Sa of the sensor element SE1. From this, in the first embodiment, attention is paid to internal stress of the support beams BM1A to BM1D occurring in the Y direction.

The third feature point in the first embodiment is that, for example, as illustrated in FIG. 9 and FIG. 10, the outer fixing portions OFU1A and OFU1B and the inner fixing portions IFU1A and IFU1B are disposed on the same side (upper side) with respect to the virtual line IL1 passing through the center in the Y direction and the outer fixing portions OFU1A and OFU1B and the inner fixing portions IFU1A and IFU1B are disposed oppositely with respect to the first region P1. And, the first region P1 and the outer fixing portions OFU1A and OFU1B are connected via the support beams BM1A to BM1B, and the first region P1 and the inner fixing portions IFU1A and IFU1B are connected via the support beams BM1C to BM1D.

This structure considers, as described above, that substrate distortion occurs radially from the center of the substrate. That is, when substrate distortion radially occurs from the center of the substrate, in FIG. 10, since the outer fixing portions OFU1A and OFU1B and the inner fixing portions IFU1A and IFU1B are disposed on the same side with respect to the virtual line IL1 passing through the center in the Y direction, the outer fixing portions OFU1A and OFU1B and the inner fixing portions IFU1A and IFU1B move to the same side (for example, a +Y direction). Here, the first region P1 is not fixed to the substrate but is suspended, and therefore does not move. Therefore, for example, when the outer fixing portions OFU1A and OFU1B and the inner fixing portions IFU1A and IFU1B move in the same +Y direction, the distance between the outer fixing portions OFU1A and OFU1B and the first region P1 is relatively increased, while the distance between the inner fixing portions IFU1A and IFU1B and the first region P1 is relatively decreased. This means that while compressive stress occurs in the support beams BM1A to BM1B which connect the first region P1 and the outer fixing portions OFU1A and OFU1B, tensile stress occurs in the support beams BM1C to BM1D which connect the first region P1 and the inner fixing portions IFU1A and IFU1B.

That is, when the structure of the third feature point in the first embodiment is adopted, internal stress occurring in the support beams BM1A to BM1B and internal stress occurring in the support beams BM1C to BM1D vary. In this case, for example, when internal stress which increases the spring constant occurs in the support beams BM1A to BM1B, internal stress which decreases the spring constant occurs in the support beams BM1C to BM1D. As a result, when the entire support beams BM1A to BM1D are considered, fluctuations of the spring constant are cancelled out each other. From this, when the structure of the third feature point in the first embodiment is adopted, fluctuations of the spring constant can be inhibited for the entire support beams BM1A to BM1D.

Therefore, according to the first embodiment, First with the second feature point, part of substrate distortion is absorbed by deformation of the mass body MS, and only substrate distortion not absorbed by the first region P1 is applied to the support beams BM1A to BM1D, thereby reducing influences of substrate distortion. And, according to the first embodiment, further with the third feature point, when the entire support beams BM1A to BM1D are considered, internal stress occurring in the support beams BM1A to BM1B and internal stress occurring in the support beams BM1C to BM1D are opposite to each other, and therefore fluctuations of the spring constant are cancelled out each other, and fluctuations of the spring constant can be inhibited for the entire support beams BM1A to BM1D.

From the above description, according to the first embodiment, by a synergistic effect of the second feature point and the third feature point described above, fluctuations of the natural frequency based on temperature change can be sufficiently inhibited. Therefore, furthermore, fluctuations of the sensitivity of the acceleration sensor S1 due to fluctuations of the natural frequency of the vibration system can also be inhibited.

For example, as a method of correcting characteristic fluctuations due to temperature change of the acceleration sensor, there is an electrical correcting method of recording an output value of the acceleration sensor at each temperature point and correcting the output values so that these fall within a predetermined specification range of an entire use temperature range. However, when the output values of the acceleration sensor at the respective temperature points exhibit non-linear behavior, output values at many temperature points and complex correction arithmetic operating processing are required for correction. Also, an expensive evaluation apparatus equipped with a thermostat bath is required, leading to an increase in manufacturing cost.

Regarding this point, according to the acceleration sensor S1 in the first embodiment, since the acceleration sensor has the second feature point and the third feature point described above, fluctuations of the natural frequency of the vibration system can be inhibited also in a wide use temperature range. Thus, according to the acceleration sensor S1 in the first embodiment, sophisticated temperature characteristic correction by a signal processing circuit is not required, and it is possible to improve reliability of the acceleration sensor S1, decrease the size of the signal processing circuit, simplify temperature characteristic correction at the time of shipping of the acceleration sensor S1, and the like. With this, reduction in manufacturing cost can be achieved.

Operation of Acceleration Sensor in First Embodiment

The acceleration sensor S1 in the first embodiment is configured as described above, and its operation is briefly described below.

Figure 11:
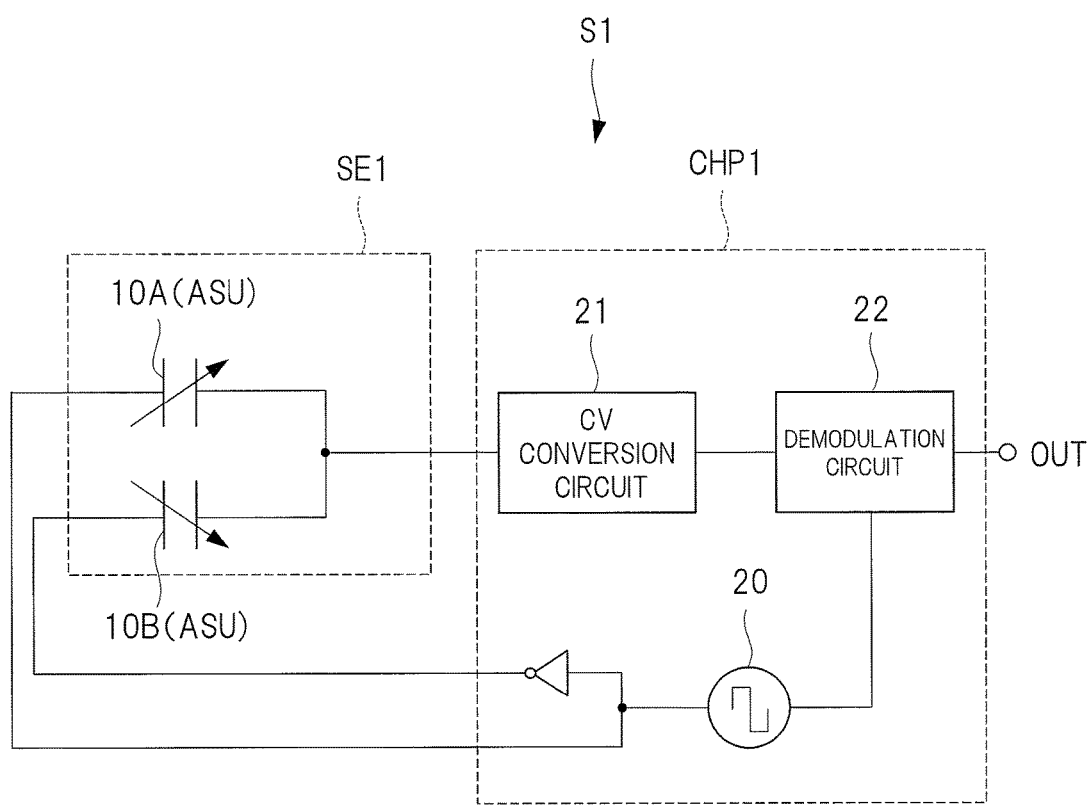
FIG. 11 is a circuit block diagram illustrating a circuit structure of the acceleration sensor in the first embodiment.

FIG. 11 is a circuit block diagram illustrating a circuit structure of the acceleration sensor S1 in the first embodiment. First, in FIG. 11, when acceleration is externally applied, the mass body disposed inside the sensor element SE1 is displaced in proportion to the magnitude of acceleration externally applied. Then, by following this displacement of the mass body, electrostatic capacities of a capacitive element 10A and a capacitive element 10B configuring the acceleration detecting portion ASU integrally formed with the mass body is changed. This change of the electrostatic capacity in the acceleration detecting portion ASU is converted to a voltage signal at a CV conversion circuit 21 formed on the semiconductor chip CHP1. Then, the voltage signal obtained by conversion at the CV conversion circuit 21 is restored at a demodulation circuit 22 to an acceleration signal, and the acceleration signal is outputted from an output terminal OUT. As such, the acceleration sensor S1 in the first embodiment operates.

Specifically, in the first embodiment, for the purpose of reducing influences of electromagnetic noise present in the environment and improving signal transmission efficiency, a carrier signal (carrier wave) 20 of several hundreds of kHz is used for detecting electrostatic capacity of the capacitive element 10A and the capacitive element 10B which configure the acceleration detecting portion ASU. This carrier signal 20 is applied to the capacitive element 10A. On the other hand, to the capacitive element 10B, a carrier signal having a phase difference of 180 degrees with respect to the carrier signal 20 is applied. Furthermore, since the capacitive element 10A and the capacitive element 10B are designed to have a same initial capacity C0, when the mass body is disposed at an initial position, that is, when there is no difference in electrostatic capacity between the capacitive element 10A and the capacitive element 10B, the carrier signals having the phase difference of 180 degrees are cancelled out inside the mass body, and are not outputted from the sensor element SE1.

On the other hand, when the mass body is displaced in proportion to acceleration externally applied, a capacity difference occurs between the capacitive element 10A and the capacitive element 10B, +ΔC and −ΔC, respectively, from the initial capacity C0, and a signal in proportion to 2ΔC is inputted from the sensor element SE1 to the semiconductor chip CHP1. This signal inputted to the semiconductor chip CHP1 is converted at the CV conversion circuit 21 formed inside the semiconductor chip CHP1, and is then restored at the demodulation circuit 22 to an acceleration signal at an actual behavior frequency of the mass body.

As such, according to the acceleration sensor S1 in the first embodiment, when acceleration is externally applied, an acceleration signal according to the applied acceleration can be outputted.

Typical Effects in First Embodiment (1) In the first embodiment, with the first feature point, while the three-point supporting structure is basically adopted in which the mass body MS is supported by three fixing portions, the structure is such that the mass body MS is suspended by four support beams. With this, according to the acceleration sensor S1 in the first embodiment, not only the natural frequency of the vibration mode in which the mass body MS vibrates in the X direction but also the natural frequency of the unwanted mode due to rotation and torsion can be shifted to a high frequency band side with less 1/f noise. As a result, in the acceleration sensor S1 in the first embodiment, not only in the vibration mode in which the mass body MS vibrates in the X direction but also in the unwanted mode due to rotation and torsion, it is possible to provide the acceleration sensor S1 capable of easily performing separation of vibration disturbance and the natural frequency and sufficiently inhibiting fluctuations of the natural frequency based on temperature change. That is, according to the acceleration sensor S1 in the first embodiment, it is possible to provide the acceleration sensor S1 that is not susceptible to (is robust against) temperature change and vibration disturbance in the implementation environment of the acceleration sensor S1. In particular, according to the first embodiment, since the natural frequency of the vibration mode of the vibration system in which the mass body vibrates in the X direction can be shifted to a high frequency band, the present embodiment is suitable for application not only to an automobile sideslip prevention system but also to, for example, a system which detects high acceleration for controlling actuation of an airbag.

(2) According to the first embodiment, from the second feature point, part of substrate distortion can be absorbed by deformation of the mass body MS. From this, according to the first embodiment, a change of the natural frequency due to temperature change can reduce matching of the natural frequency and vibration disturbance, thereby effectively inhibiting erroneous operation and failure of the acceleration sensor S1 and improving reliability of the acceleration sensor S1.

(3) According to the first embodiment, from the third feature point, for example, when the entire support beams BM1A to BM1D are considered by paying attention to the support beams BM1A to BM1D, internal stress occurring in the support beams BM1A to BM1B and internal stress occurring in the support beams BM1C to BM1D can be reversed. Therefore, fluctuations of the spring constant can be cancelled out. With this, fluctuations of the spring constant can be inhibited for the entire support beams BM1A to BM1D.

(4) From the above description, according to the first embodiment, by a synergistic effect of the second feature point and the third feature point described above, fluctuations of the natural frequency based on temperature change can be sufficiently inhibited. Therefore, furthermore, fluctuations of the sensitivity of the acceleration sensor S1 due to fluctuations of the natural frequency of the vibration system can also be inhibited. As such, since the acceleration sensor S1 in the first embodiment is excellent in resistance to substrate distortion due to environment temperature change, excellent characteristics can be kept also in a wide temperature range, including an automobile engine room with harsh temperature environments.

(5) Also, according to the first embodiment, sophisticated temperature characteristic correction by a signal processing circuit is not required, and it is possible to improve reliability of the acceleration sensor, decrease the size of the signal processing circuit, simplify temperature characteristic correction at the time of shipping of the acceleration sensor, and the like. With this, reduction in manufacturing cost can be achieved.

First Modification Example

Figure 12:
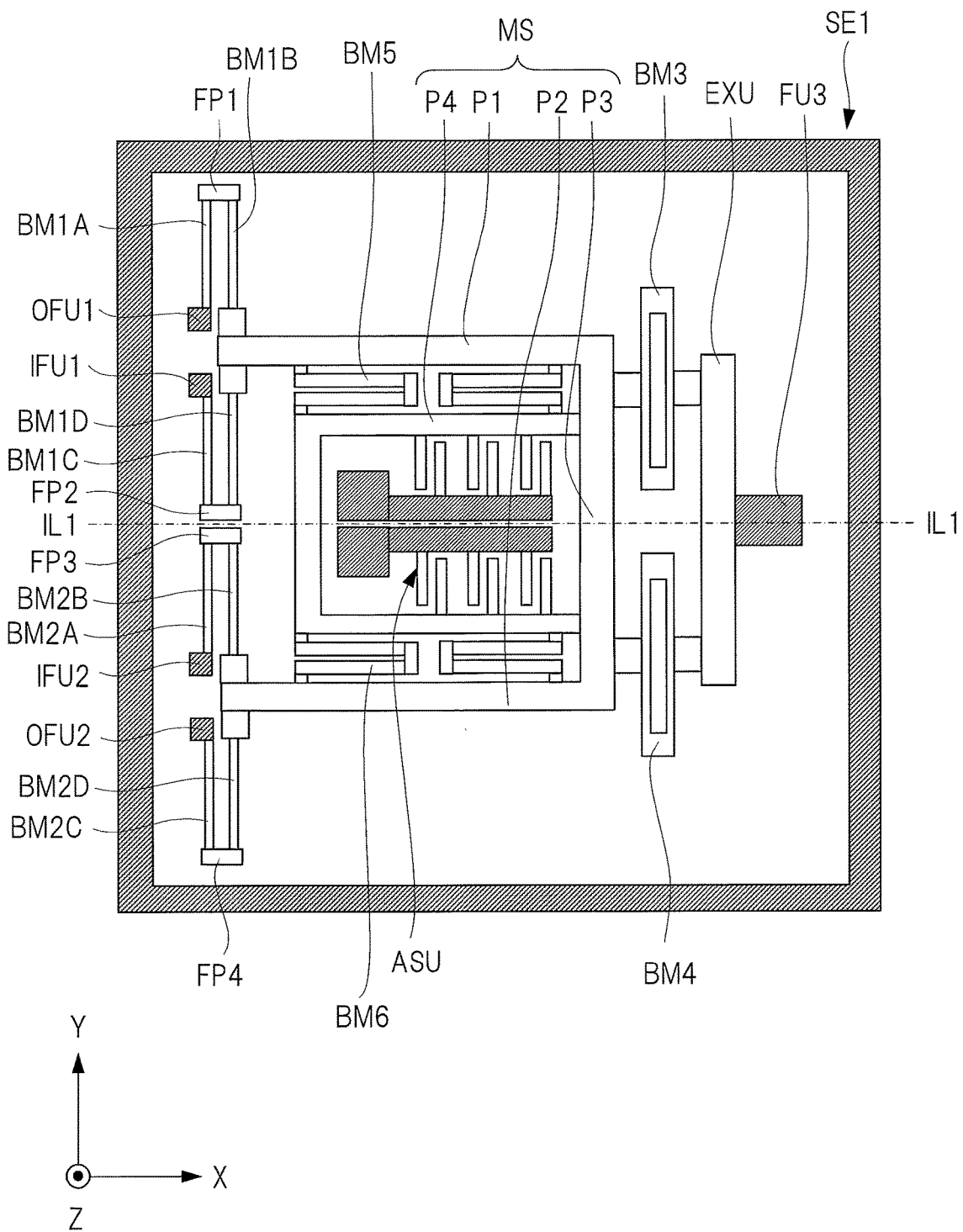
FIG. 12 is a plan view illustrating the structure of a sensor element in a first modification example.

Next, a first modification example in the first embodiment is described. FIG. 12 is a plan view illustrating the structure of a sensor element SE1 in the first modification example. Since the sensor element SE1 in the first modification example illustrated in FIG. 12 has a structure approximately similar to that of the sensor element SE1 in the first embodiment illustrated in FIG. 9, different points are mainly described.

In FIG. 12, in the first modification example, the free end FP1 is provided outside the first region P1. The first region P1 and the free end FP1 are connected via the support beam BM1B extending in the Y direction, and the free end FP1 and an outer fixing portion OFU1 are connected via the support beam BM1A extending in the Y direction. Therefore, the first region P1 and the outer fixing portion OFU1 are connected via the support beam BM1A and the support beam BM1B connected to the free end FP1.

Furthermore, the free end FP2 is provided inside the first region P1. The first region P1 and the free end FP2 are connected via the support beam BM1D extending in the Y direction, and the free end FP2 and an inner fixing portion IFU1 are connected via the support beam BM1C extending in the Y direction. Therefore, the first region P1 and the inner fixing portion IFU1 are connected via the support beams BM1C and BM1D connected to the free end FP2.

Also, the free end FP3 is provided inside the second region P2. The second region P2 and the free end FP3 are connected via the support beam BM2B extending in the Y direction, and the free end FP3 and an inner fixing portion IFU2 are connected via the support beam BM2A extending in the Y direction. Therefore, the second region P2 and the inner fixing portion IFU2 are connected via the support beam BM2A and the support beam BM2B connected to the free end FP3.

Furthermore, the free end FP4 is provided outside the second region P2. The second region P2 and the free end FP4 are connected via the support beam BM2D extending in the Y direction, and the free end FP4 and an outer fixing portion OFU2 are connected via the support beam BM2C extending in the Y direction. Therefore, the second region P2 and the outer fixing portion OFU2 are connected via the support beam BM2C and the support beam BM2D connected to the free end FP4.

As with the sensor element SE1 in the first embodiment, the sensor element SE1 in the above-described first modification example also has the first feature point, the second feature point, and the third feature point. Therefore, effects similar to those in the sensor element SE1 in the first embodiment can be obtained also in the sensor element SE1 in the first modification example.

Second Modification Example

Figure 13:
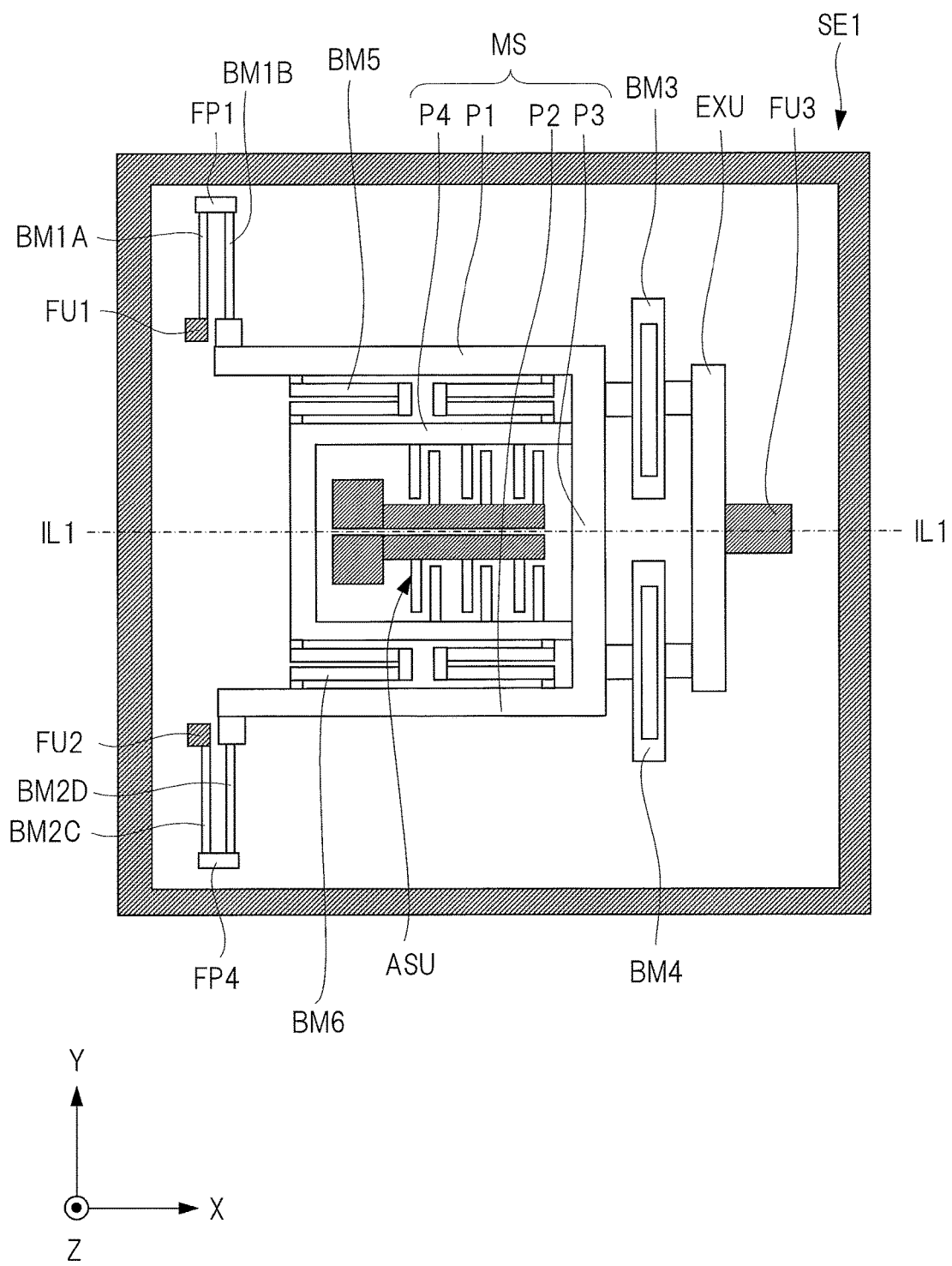
FIG. 13 is a plan view illustrating the structure of a sensor element in a second modification example.

Next, a second modification example in the first embodiment is described. FIG. 13 is a plan view illustrating the structure of a sensor element SE1 in the second modification example. Since the sensor element SE1 in the second modification example illustrated in FIG. 13 has a structure approximately similar to that of the sensor element SE1 in the first embodiment illustrated in FIG. 9, different points are mainly described.

In FIG. 13, in the second modification example, the free end FP1 is provided outside the first region P1. The first region P1 and the free end FP1 are connected via the support beam BM1B extending in the Y direction, and the free end FP1 and a fixing portion FU1 are connected via the support beam BM1A extending in the Y direction. Therefore, the first region P1 and the fixing portion FU1 are connected via the support beam BM1A and the support beam BM1B connected to the free end FP1.

Also, the free end FP4 is provided outside the second region P2. The second region P2 and the free end FP4 are connected via the support beam BM2D extending in the Y direction, and the free end FP4 and a fixing portion FU2 are connected via the support beam BM2C extending in the Y direction. Therefore, the second region P2 and the fixing portion FU2 are connected via the support beam BM2C and the support beam BM2D connected to the free end FP4.

As with the sensor element SE1 in the first embodiment, the sensor element SE1 in the above-described second modification example also has the first feature point and the second feature point. Therefore, among the effects in the sensor element SE1 in the first embodiment, the effect based on the first feature point and the effect based on the second feature point can be obtained also in the sensor element SE1 in the second modification example.

Second Embodiment

In a second embodiment, an angular rate sensor is taken as an example of an inertial sensor and described. The angular rate sensor is a sensor which detects angular rate by using a Coriolis phenomenon in which, for example, in a mass body always driven to vibrate in an X direction (driving direction), when angular rate (rotation) is applied about a Z direction orthogonal to the X direction in which this mass body is driven to vibrate, the mass body driven to vibrate in the X direction vibrates in a Y direction (detecting direction) orthogonal to the X direction and the Z direction, with a magnitude in proportion to angular rate externally applied. In the following, an example is described in which the technical idea of the present invention is applied to the angular rate sensor as described above.

Note that while an angular rate sensor which detects angular rate about the Z direction is described in the second embodiment, this principle can be widely applied also to an angular rate sensor which detects angular rate about the X direction and an angular rate sensor which detects angular rate about the Y direction. That is, the technical idea in the second embodiment can be widely applied to not only an angular rate sensor which detects in-plane angular rate but also an angular rate sensor which detects out-of-plane angular rate.

An implementation embodiment of the angular rate sensor in the second embodiment is similar to the implementation structure of the acceleration sensor S1 in the first embodiment illustrated in FIG. 7. And, as with the sensor element SE1 of the acceleration sensor S1 in the first embodiment, a sensor element of the angular rate sensor in the second embodiment can be manufactured by using semiconductor micromachining technology. The angular rate sensor in the second embodiment and the acceleration sensor S1 in the first embodiment are different in the structure of the sensor element of the angular rate sensor and the sensor element SE1 of the acceleration sensor S1. In the second embodiment, by taking the structure as described above for the sensor element of the angular rate sensor, angular rate externally applied can be detected.

Planar Structure of Sensor Element in Second Embodiment

Figure 14:
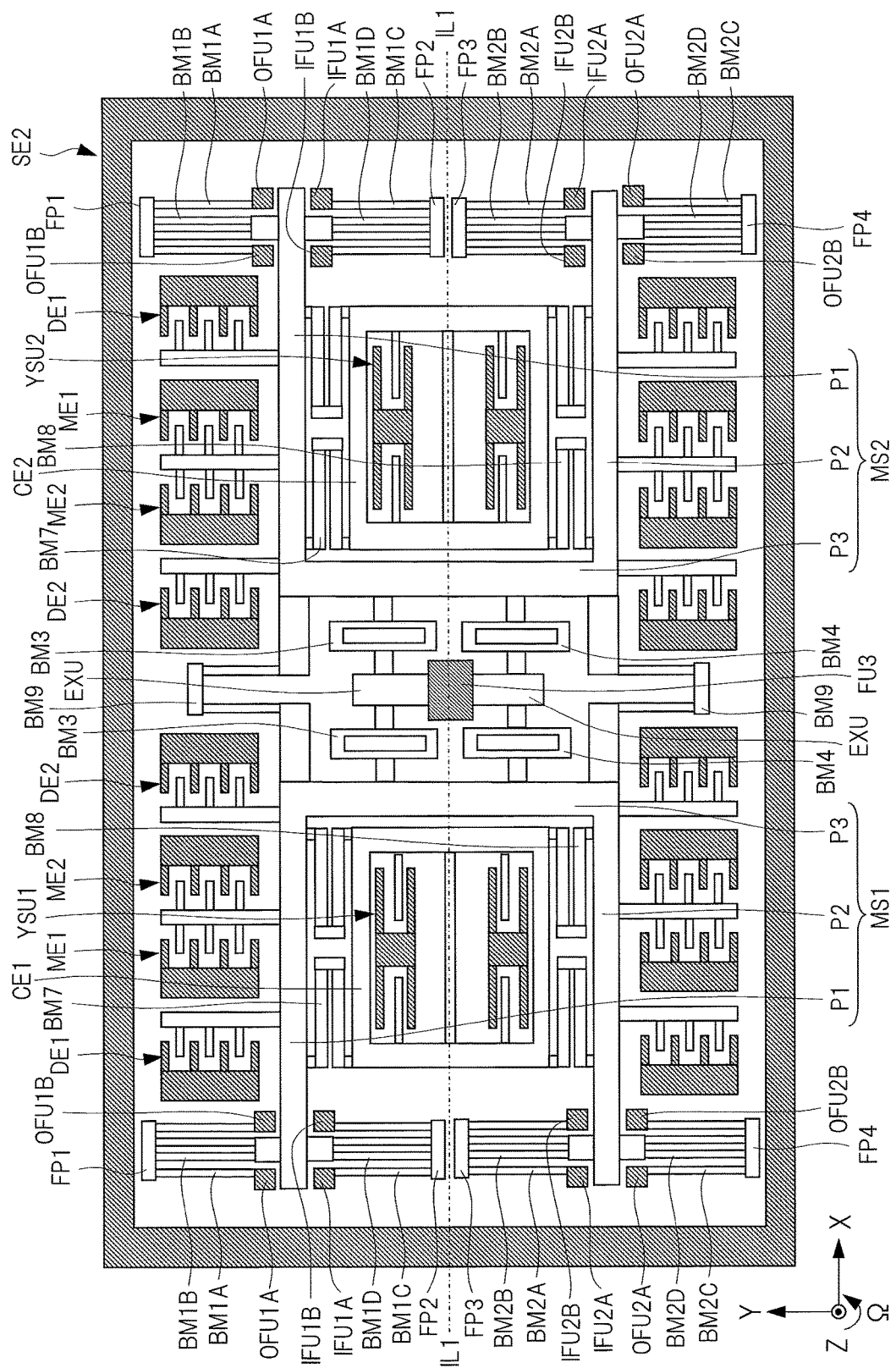
FIG. 14 is a schematic diagram illustrating a planar structure of a sensor element of an angular rate sensor in a second embodiment.

FIG. 14 is a schematic diagram illustrating a planar structure of a sensor element SE2 of the angular rate sensor in the second embodiment. In the following, the structure of the sensor element SE2 in the second embodiment is described by using this FIG. 14.

In FIG. 14, the sensor element SE2 in the second embodiment has two mass bodies MS1 and MS2. The mass body MS1 is supported via support beams BM1A to BM1D, support beams BM2A to BM2D, a support beam BM3, and a support beam BM4 which are flexible in the X direction as a first direction and rigid in the Y direction as a second direction. Similarly, the mass body MS2 is supported also by the support beams BM1A to BM1D, the support beams BM2A to BM2D, the support beam BM3, and the support beam BM4 which are flexible in the X direction as a first direction and rigid in the Y direction as a second direction.

The mass body MS1 and the mass body MS2 have a first movable electrode integrally formed so as to form a capacitive element DE1 with a first drive electrode which functions as a fixed electrode and to form a capacitive element DE2 with a second drive electrode which functions as a fixed electrode. Furthermore, the mass body MS1 and the mass body MS2 have a second movable electrode integrally formed so as to form a capacitive element ME1 and a capacitive element ME2 with a first drive amplitude monitor electrode and a second drive amplitude monitor electrode, respectively, which function as fixed electrodes.

And, in the mass body MS1, a Coriolis element CE1 is disposed so as to be contained in the mass body MS1 via support beams BM7 and BM8 which are rigid in the X direction and flexible in the Y direction. Similarly, in the mass body MS2, a Coriolis element CE2 is disposed so as to be contained in the mass body MS2 via detecting beams BM7 and BM8 which are rigid in the X direction and flexible in the Y direction.

Next, an angular rate detecting portion YSU1 is formed so as to be contained in the Coriolis element CE1, and an angular rate detecting portion YSU2 is formed so as to be contained in the Coriolis element CE2. Specifically, these angular rate detecting portion YSU1 and angular rate detecting portion YSU2 are each configured to include a movable electrode for detection integrally formed with the Coriolis element CE1 and the Coriolis element CE2 and a fixed electrode for detection fixed to a fixing member. In this case, when angular rate is externally applied about the X direction, the Coriolis element CE1 and the Coriolis element CE2 are displaced in the Y direction by the Coriolis phenomenon. Therefore, the movable electrodes for detection integrally formed with the Coriolis element CE1 and the Coriolis element CE2 are also displaced in the Y direction. On the other hand, since fixed to the fixing member, the fixed electrode for detection is not displaced even if angular rate is applied. Thus, the distance between the movable electrode for detection and the fixed electrode for detection is changed. This means that electrostatic capacity (electric capacity) of the capacitive element configured of the movable electrode for detection and the fixed electrode for detection is changed. As such, the angular rate detecting portion YSU1 and the angular rate detecting portion YSU2 are configured to capture displacement of the Coriolis element CE1 and the Coriolis element CE2, respectively, in the Y direction as a change of electrostatic capacity.

The mass body MS1 and the mass body MS2 are each configured of a first region P1 elongated in the X direction, a second region P2 elongated in the X direction, and a third region P3 extending in the Y direction so as to couple these first region P1 and second region P2. Thus, the mass body MS1 and the mass body MS2 each have a shape with one side open. The first region P1 is configured to extend in the X direction, and the second region P2 is configured to extend in the X direction as being a predetermined distance away from the first region P1 in the Y direction orthogonal to the X direction. And, the third region P3 is configured to extend in the Y direction so as to be coupled to the first region P1 and the second region P2.

For example, with respect to a virtual line IL1 passing through the center in the Y direction, the first region P1 and the second region P2 are symmetrically disposed, and the third region P3 is disposed so as to connect to these first region P1 and second region P2. And, the Coriolis element CE1 and the Coriolis element CE2 are disposed so as to be contained in a shape configured of the first region P1, the second region P2, and the third region P3, and these Coriolis element C1E and Coriolis element CE2 are each connected to the first region P1 via a detecting beam BM7 and connected to the second region P2 via a detecting beam BM8.

Near an end of the first region P1, an outer fixing portion OFU1A and an outer fixing portion OFU1B are disposed, and an inner fixing portion IFU1A and an inner fixing portion IFU1B are also disposed. In particular, the outer fixing portion OFU1A, the outer fixing portion OFU1B, the inner fixing portion IFU1A, and the inner fixing portion IFU1B are disposed on the same side with respect to the virtual line IL1. Furthermore, the outer fixing portion OFU1A and the inner fixing portion IFU1A are disposed symmetrically with respect to the first region P1, and the outer fixing portion OFU1B and the inner fixing portion IFU1B are also disposed symmetrically with respect to the first region P1.

And, a free end FP1 is provided outside the first region P1. The first region P1 and the free end FP1 are connected via the support beam BM1B extending in the Y direction, and the free end FP1 and the outer fixing portion OFU1A are connected via the support beam BM1A extending in the Y direction. Therefore, the first region P1 and the outer fixing portion OFU1A are connected via the support beam BM1A and the support beam BM1B connected to the free end FP1. Similarly, the first region P1 and the free end FP1 are connected via the support beam BM1B extending in the Y direction, and the free end FP1 and the outer fixing portion OFU1B are connected via the support beam BM1A extending in the Y direction. Therefore, the first region P1 and the outer fixing portion OFU1B are also connected via the support beam BM1A and the support beam BM1B connected to the free end FP1.

Furthermore, a free end FP2 is provided inside the first region P1. The first region P1 and the free end FP2 are connected via the support beam BM1D extending in the Y direction, and the free end FP2 and the inner fixing portion IFU1A are connected via the support beam BM1C extending in the Y direction. Therefore, the first region P1 and the inner fixing portion IFU1A are connected via the support beam BM1C and the support beam BM1D connected to the free end FP2. Similarly, the first region P1 and the free end FP2 are connected via the support beam BM1D extending in the Y direction, and the free end FP2 and the inner fixing portion IFU1B are connected via the support beam BM1C extending in the Y direction. Therefore, the first region P1 and the inner fixing portion IFU1B are also connected via the support beam BM1C and the support beam BM1D connected to the free end FP2.

Also, a free end FP3 is provided inside the second region P2. The second region P2 and the free end FP3 are connected via the support beam BM2B extending in the Y direction, and the free end FP3 and the inner fixing portion IFU2A are connected via the support beam BM2A extending in the Y direction. Therefore, the second region P2 and the inner fixing portion IFU2A are connected via the support beam BM2A and the support beam BM2B connected to the free end FP3. Similarly, the second region P2 and the free end FP3 are connected via the support beam BM2B extending in the Y direction, and the free end FP3 and the inner fixing portion IFU2B are connected via the support beam BM2A extending in the Y direction. Therefore, the second region P2 and the inner fixing portion IFU2B are also connected via the support beam BM2A and the support beam BM2B connected to the free end FP3.

Furthermore, a free end FP4 is provided outside the second region P2. The second region P2 and the free end FP4 are connected via the support beam BM2D extending in the Y direction, and the free end FP4 and the outer fixing portion OFU2A are connected via the support beam BM2C extending in the Y direction. Therefore, the second region P2 and the outer fixing portion OFU2A are connected via the support beam BM2C and the support beam BM2D connected to the free end FP4. Similarly, the second region P2 and the free end FP4 are connected via the support beam BM2D extending in the Y direction, and the free end FP4 and the outer fixing portion OFU2B are connected via the support beam BM2C extending in the Y direction. Therefore, the second region P2 and the outer fixing portion OFU2B are also connected via the support beam BM2C and the support beam BM2D connected to the free end FP4.

Next, in the sensor element SE2 in the second embodiment, as illustrated in FIG. 14, a fixing portion FU3 is provided on the virtual line IL1 passing through the center in the Y direction. To this fixing portion FU3, an extending portion EXU extending in the Y direction is connected. This extending portion EXU is elongated in the Y direction, and has a width in the X direction sufficiently large compared with the other support beams BM1A to BM1D, support beams BM2A to BM2D, support beam BM3, and support beam BM4. Thus, the extending portion EXU is difficult to move in any of directions including the X direction and the Y direction.

And, the respective third regions P3 configuring part of the mass body MS1 and the mass body MS2 and the extending portion EXU are connected via the support beam BM3, and are connected via the support beam BM4. Here, the support beam BM3 and the support beam BM4 are disposed oppositely with respect to the virtual line IL1. For example, the support beam BM3 and the support beam BM4 are disposed symmetrically with respect to the virtual line IL1.

Subsequently, the mass body MS1 and the mass body MS2 are connected via a link beam BM9 so as to configure a tuning fork structure which share each vibration energy. Here, with the sensor element SE2 in the second embodiment being configured as a tuning fork structure, for example, even if an error at the time of processing is present in any of the mass body MS1, the mass body MS2, the support beams BM1A to BM1D, the support beams BM2A to BM2D, the support beam BM3, and the support beam BM4 which configure a drive vibration system, beautiful resonance characteristics can be obtained. Furthermore, also in the detection vibration system configured of the Coriolis element CE1, the Coriolis element CE2, the detecting beam BM7 and the detecting beam BM8, it is possible to easily remove noise components such as vibration disturbance and separate only a signal due to application of angular rate.

Operation of Angular Rate Sensor in Second Embodiment

The angular rate sensor in the second embodiment is configured as described above, and the operation thereof is described below.

Figure 15:
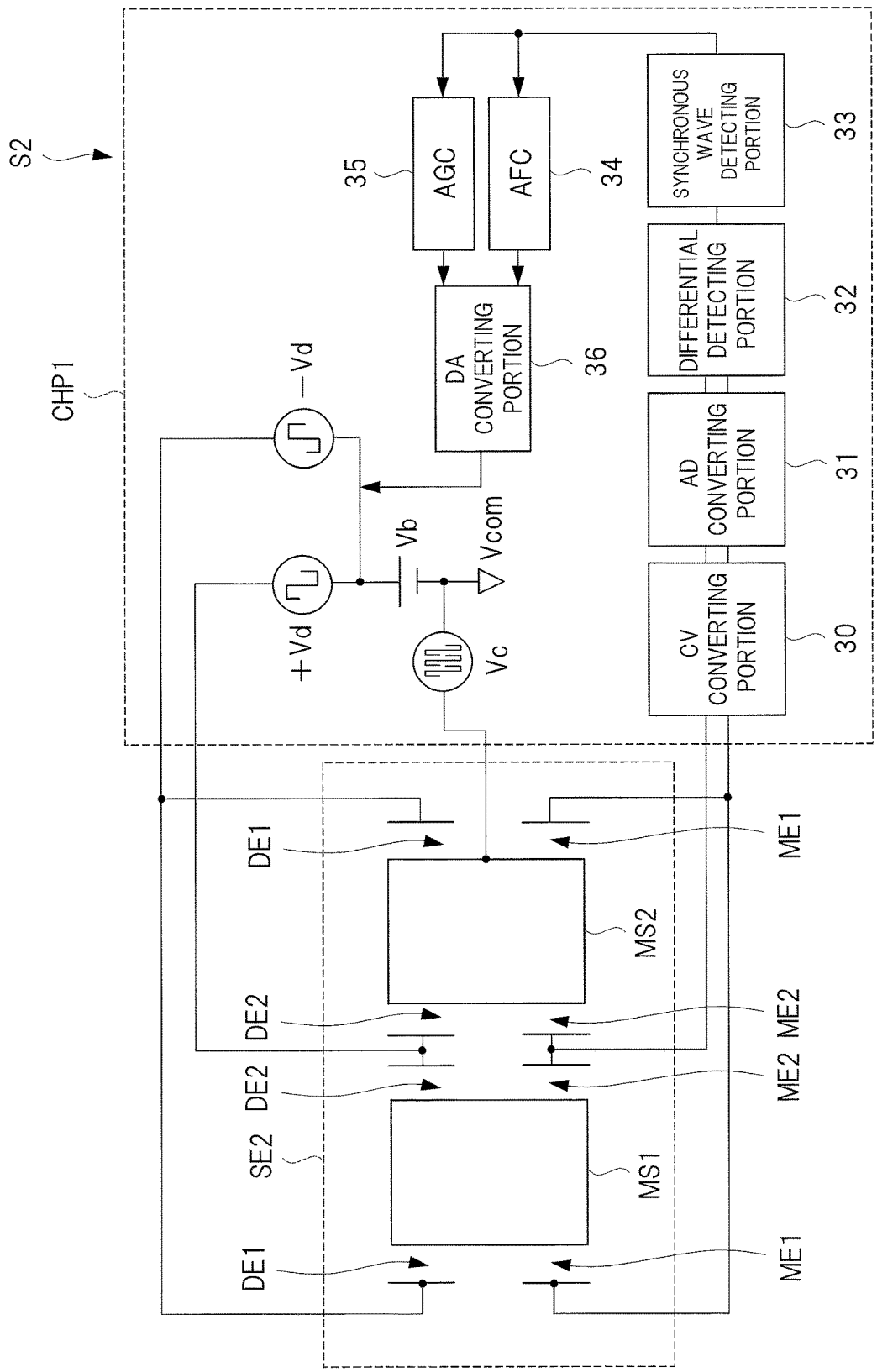
FIG. 15 is a circuit block diagram illustrating a circuit structure for controlling drive vibration of the angular rate sensor in the second embodiment.

FIG. 15 a circuit block diagram illustrating a circuit structure for controlling drive vibration of the angular rate sensor S2 in the second embodiment. In FIG. 15, the capacitive element DE1 and the capacitive element DE2 configure driving means for vibrating the mass body MS1 and the mass body MS2 in the X direction. And, to a first drive electrode as a fixed electrode which configures part of the capacitive element DE1, Vcom+Vb−Vd is applied as a drive signal from a signal processing circuit formed in the semiconductor chip CHP1. On the other hand, to a second drive electrode as a fixed electrode which configures part of the capacitive element DE2, Vcom+Vb+Vd is applied as a drive signal from the signal processing circuit formed in the semiconductor chip CHP1.

Also, to the mass body MS1 and the mass body MS2, via the fixing portion FU3 coupled to the extending portion EXU connected to the support beam BM3 and the support beam BM4, Vcom is applied from the signal processing circuit formed in the semiconductor chip CHP1. Therefore, a potential difference between the first drive electrode as a fixed electrode and the mass body MS1 and the mass body MS2 is Vb−Vd, and a potential difference between the second drive electrode as a fixed electrode and the mass body MS1 and the mass body MS2 is Vb+Vd. As a result, electrostatic forces due to the above-described potential differences occur in the capacitive element DE1 and the capacitive element DE2, thereby causing the mass body MS1 and the mass body MS2 to make reversed-phase vibration (drive vibration) in the X direction.

Note that while a carrier signal Vc is also applied from the signal processing circuit to the mass body MS1 and the mass body MS2, the frequency of the carrier signal Vc is of several hundreds of kHz and is sufficiently high to a degree that the above-described drive vibration cannot follow, and therefore does not function as driving force, and also, although not restricted, in the angular rate sensor S2 in the second embodiment, in order to obtain large drive amplitude in the X direction with small drive voltage, the frequency (drive frequency) of a drive signal Vd is matched with the natural frequency of a drive vibration system (reversed-phase vibration system) configured of the mass bodies MS1 and MS2, the support beams BM1A to BM1D, the support beams BM2A to BM2D, the support beam BM3, the support beam BM4, and the link beam BM9. Also in the second embodiment, in order to let the drive frequency follow a change of the natural frequency of the drive vibration system due to fluctuations of ambient environment, feedback control is performed by using an AFC (Auto Frequency Control) 34 by PLL (Phase Locked Loop) and a DA converting portion 36.

Furthermore, in the second embodiment, the drive amplitudes of the mass body MS1 and the mass body MS2 are monitored by detecting changes of electrostatic capacities of the capacitive element ME1 formed of the first drive amplitude monitor electrode functioning as a fixed electrode and the second movable electrode integrally formed with the mass body MS1 and the mass body MS2. Similarly, the drive amplitudes of the mass body MS1 and the mass body MS2 are monitored by detecting changes of electrostatic capacity of the capacitive element ME2 formed of the second drive amplitude monitor electrode functioning as a fixed electrode and the second movable electrode integrally formed with the mass body MS1 and the mass body MS2.

Specifically, to the mass body MS1 and the mass body MS2, the carrier signal Vc with a frequency of several hundreds of kHz is applied. In this case, with the carrier signal Vc, a change occurs in the electrostatic capacity of the capacitive element ME1 configured of the mass body MS1, the mass body MS2, and the first drive amplitude monitor electrode (fixed electrode) and the electrostatic capacity of the capacitive element ME2 configured of the mass body MS1, the mass body MS2, and the second drive amplitude monitor electrode (fixed electrode), and movement of electric charges occurs according to this change of electrostatic capacity. The change of electrostatic capacity is converted at a CV converting portion 30 illustrated in FIG. 15 to an analog voltage signal, and is then converted at an AD converting portion 31 to a digital voltage signal. Then, a first digital voltage signal passing from the capacitive element ME1 through the CV converting portion 30 and the AD converting portion 31 and a second digital voltage signal passing from the capacitive element ME2 through the CV converting portion 30 and the AD converting portion 31 are subjected to arithmetic operation at a differential detecting portion 32. Here, when the drive amplitude is 0, initial electrostatic capacities of the capacitive element ME1 and the capacitive element ME2 are cancelled out, and therefore an input voltage to a synchronous wave detecting portion 33 is 0.

On the other hand, when the mass body MS1 and the mass body MS2 perform reversed-phase vibration, by following the drive amplitudes of the mass body MS1 and the mass body MS2, the electrostatic capacity of the capacitive element ME1 is increased and the electrostatic capacity of the capacitive element ME2 is decreased. Alternatively, by following the drive amplitudes of the mass body MS1 and the mass body MS2, the electrostatic capacity of the capacitive element ME1 is decreased and the electrostatic capacity of the capacitive element ME2 is increased. From this, from the differential detecting portion 32, a digital signal in proportion to the drive amplitude of reversed-phase vibration is outputted.

The digital signal outputted from the differential detecting portion 32 is converted at the synchronous wave detecting portion 33 to drive frequency components (for example, several tens of kHz) and low-frequency components (for example, several hundreds of kHz from DC) including DC as required. The drive amplitude converted to a low-frequency digital signal is inputted to an AGC (Auto Gain Control) 35, and is compared with a drive amplitude target value set in advance. Then, based on this comparison result, the magnitude of the drive signal Vd is adjusted at the DA converting portion 36. With this, feedback control is carried out so that the drive amplitude becomes the target value set in advance. In the manner described above, in the angular rate sensor S2 in the second embodiment, of the mass body MS1 and the mass body MS2 can be caused to perform drive vibration (reversed-phase vibration) with a certain drive amplitude in the X direction.

Subsequently, described is an angular rate detecting operation when angular rate is applied about the Z direction with the mass body MS1 and the mass body MS2 are driven to vibrate in the X direction.

Figure 16:
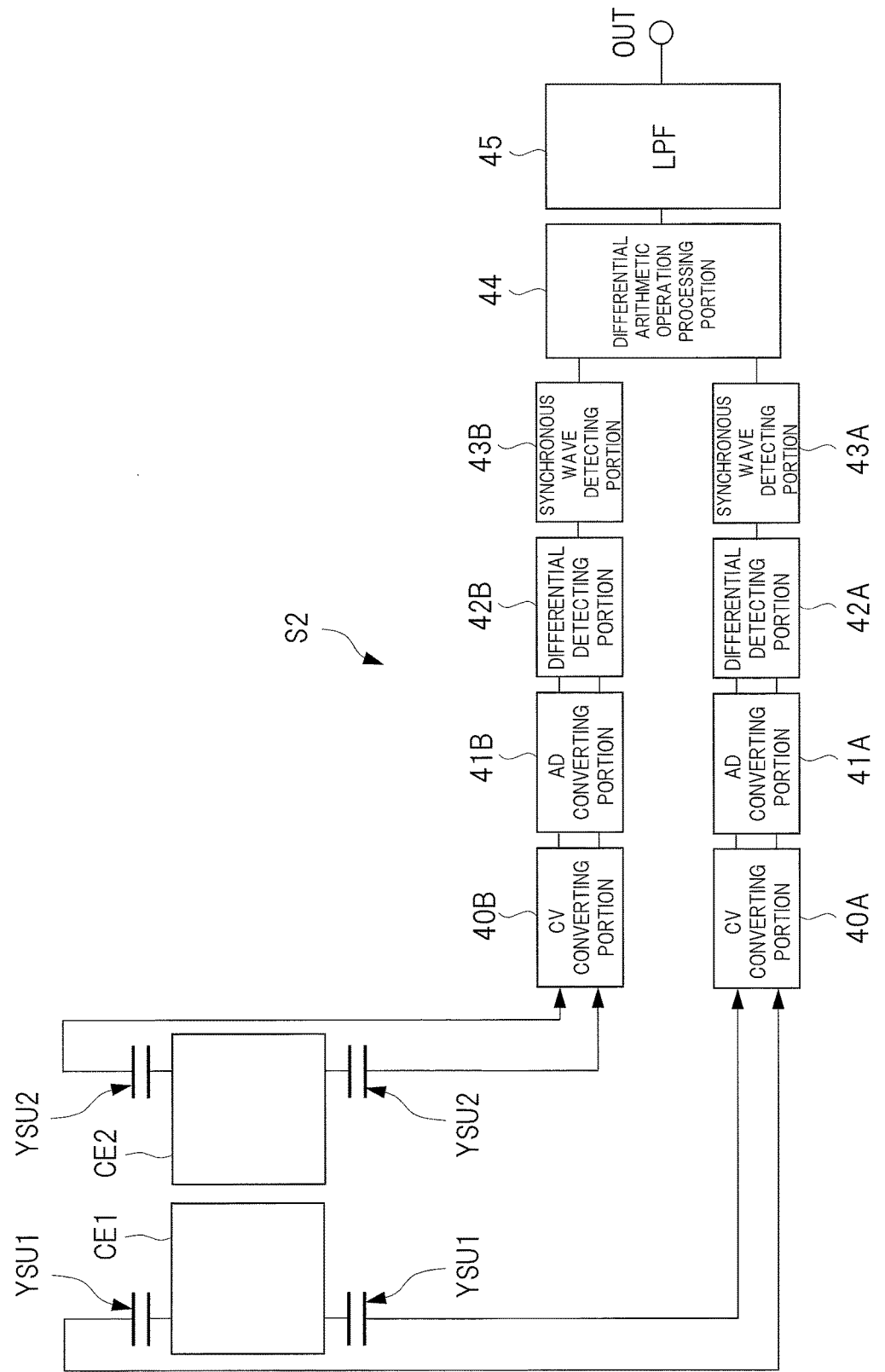
FIG. 16 is a circuit block diagram illustrating the structure of a detection circuit of the angular rate sensor in the second embodiment.

FIG. 16 is a circuit block diagram illustrating the structure of a detection circuit of the angular rate sensor S2 in the second embodiment. First, when an angular rate Ω is applied about the Z direction with the mass body MS1 and the mass body MS2 performing reversed-phase vibration (drive vibration), a Coriolis force Fc represented by (Equation 3) occurs in the mass body MS1 and the mass body MS2, and vibration in the Y direction in proportion to the applied angular rate Ω occurs.

$$Fc = 2 \cdot m \cdot \Omega \cdot X \cdot \omega x \cdot \cos(\omega x \cdot t) \tag{Equation 3}$$

Here, in (Equation 3), Fc is Coriolis force, m is the mass of the mass body MS1 or the mass body MS2, and Ω is angular rate externally applied. Also, X is a maximum amplitude in the X direction, ωx/2π is drive frequency (natural frequency of the drive vibration system), and t is time.

Here, since the mass body MS1 and the mass body MS2 perform reversed-phase vibration, vibrations in the Y direction are also in reversed phase. However, since the mass body MS1 and the mass body MS2 are supported by the support beams BM1A to BM1D, the support beams BM2A to BM2D, the support beam BM3, and the support beam BM4 which are flexible in the X direction and rigid in the Y direction, the mass bodies are hardly displaced in the Y direction even if the above-described Coriolis force Fc occurs. On the other hand, since the Coriolis element CE1 and the Coriolis element CE2 are connected to the mass body MS1 and the mass body MS2 via the detecting beam BM7 and the detecting beam BM8 which are rigid in the X direction and are flexible in the Y direction, the Coriolis elements are displaced based on the Coriolis force Fc in a relation as represented in (Equation 4).

$$y = Fc \cdot Qy / ky \tag{Equation 4}$$

Here, y is detection amplitude, Qy is a mechanical quality coefficient of a detection vibration system, and ky is a spring constant of the detecting beam BM7 and the detecting beam BM8 in the Y direction.

As illustrated in FIG. 16, when the Coriolis element CE1 is displaced in the Y direction, the electrostatic capacity of the capacitive element configuring the angular rate detecting portion YSU1 provided so as to be connected to the Coriolis element CE1 is changed. Similarly, when the Coriolis element CE2 is displaced in the Y direction, the electrostatic capacity of the capacitive element configuring the angular rate detecting portion YSU2 provided so as to be connected to the Coriolis element CE2 is also changed.

For example, the change of the electrostatic capacity of the capacitive element configuring the angular rate detecting portion YSU1 is converted at a CV converting portion 40A to an analog voltage signal, and is then converted at an AD converting portion 41A to a digital voltage signal. Then, after arithmetic operation at a differential detecting portion 42A, a demodulated signal is extracted at a synchronous wave detecting portion 43A. Similarly, the change of the electrostatic capacity of the capacitive element configuring the angular rate detecting portion YSU2 is converted at a CV converting portion 40B to an analog voltage signal, and is then converted at an AD converting portion 41B to a digital voltage signal. Then, after arithmetic operation at a differential detecting portion 42B, a demodulated signal is extracted at a synchronous wave detecting portion 43B.

Then, the demodulated signal obtained by demodulation at the synchronous wave detecting portion 43A and the demodulated signal obtained by demodulation at the synchronous wave detecting portion 43B are inputted to a differential arithmetic operation processing portion 44 for arithmetic operation, and then pass through an LPF (low-frequency band-pass filter) 45. With this, an angular rate signal is eventually outputted from an output terminal OUT. As such, according to the angular rate sensor S2 in the second embodiment, angular rate can be detected.

Features of Second Embodiment

In the sensor element SE2 in the second embodiment, for example, as illustrated in FIG. 14, the outer fixing portions OFU1A and OFU1B and the inner fixing portions IFU1A and IFU1B connected to the first region P1 are considered as one integral fixing portion, and the outer fixing portions OFU2A and OFU2B and the inner fixing portions IFU2A and IFU2B connected to the second region P2 are considered as one integral fixing portion. Then, the sensor element SE2 in the second embodiment illustrated in FIG. 14 has a three-point supporting structure by the above-described two fixing portions and the fixing portion FU3. That is, it can be found that the sensor element SE2 in the second embodiment basically has the three-point structure in which the mass body MS1 and the mass body MS2 are supported by three fixing portions. Therefore, as with the three-point supporting structure described in the Non-Patent Document 1, the sensor element SE2 in the second embodiment also can easily perform separation of vibration disturbance and the natural frequency and can sufficiently inhibit fluctuations of the natural frequency based on temperature change. That is, also in the sensor element SE2 in the second embodiment, the natural frequency of the vibration system in which the mass body MS1 and the mass body MS2 are driven to vibrate in the X direction can be easily shifted to a high frequency band.

Here, sensitivity Sw of the angular rate sensor in the second embodiment can be given by arranging the above-described (Equation 3) and (Equation 4).

$$Sw = y/\Omega = 2 \cdot m \cdot X \cdot \omega x \cdot \cos(\omega x \cdot t) * Qy/ky \quad \text{(Equation 5)}$$

From the above description-described (Equation 5), it can be found that, in order to keep the sensitivity of the angular rate sensor constant irrespectively of fluctuations in ambient environment, it is required to keep the drive amplitude X, the natural frequency ox of the drive vibration system, and the mechanical quality coefficient Qy of the detection vibration system constant. Here, while the mechanical quality coefficient Qy of the detection vibration system is a component depending on temperature, its influences can be minimized by, for example, using servo control, and therefore the mechanical quality coefficient can be regarded as an invariable value. Also, the drive amplitude X can be set at a constant value by using feedback control by the AGC 35 described above. Therefore, the sensitivity Sw of the angular rate sensor is a function of only the natural frequency ox of the drive vibration system.

Regarding this point, in the second embodiment, as described above, the natural frequency of the vibration system in which the mass body MS1 and the mass body MS2 are driven to vibrate in the X direction is shifted to a high frequency band. This means that the natural frequency of the drive vibration system increases, and it can be found that the sensitivity Sw of the angular rate sensor is also improved from (Equation 5). That is, in the second embodiment, a main focus is directed to shifting the natural frequency of the drive vibration system to a high frequency band side with less 1/f noise in order to avoid resonance between vibration disturbance typified by 1/f noise and the natural frequency of the drive vibration system. Furthermore, by shifting the natural frequency of the drive vibration system to a high frequency band side, an advantage of capable of improving the sensitivity of the angular rate sensor can also be obtained.

On the other hand, in the sensor element SE2 in the second embodiment, unlike the technology described in Non-Patent Document 1, the fixing portion FU3 and the third region P3 are not supported by one support beam disposed on the virtual line IL1. Specifically, in the sensor element SE2 in the second embodiment, for example, as illustrated in FIG. 14, the extending portion EXU is provided so as to connect to the fixing portion FU3, this extending portion EXU and the third region P3 which configures part of the mass body MS1 are connected via the support beam BM3 and the support beam BM4, and the support beam BM3 and the support beam BM4 are disposed oppositely with respect to the virtual line IL1 (first feature point). Similarly, in the second embodiment, the extending portion EXU and the third region P3 which configures part of the mass body MS2 are connected via the support beam BM3 and the support beam BM4, and the support beam BM3 and the support beam BM4 are disposed oppositely with respect to the virtual line IL1 (first feature point).

Here, when the support beams BM1A to BM1D are considered as one support beam and the support beams BM2A to BM2D are considered as one support beam, the mass body MS1 and the mass body MS2 in the second embodiment are connected via the above-described two support beams, support beam BM3, and support beam BM4. That is, in the second embodiment, a structure is adopted in which, while the three-point supporting structure is basically adopted in which the mass body MS1 and the mass body MS2 are supported by the three fixing portions, the mass body MS1 and the mass body MS2 are suspended by four support beams. As a result, according to the sensor element SE2 in the second embodiment, not only the natural frequency of the vibration mode in which the mass body MS1 and the mass body MS2 are driven to vibrate in the X direction but also the natural frequency of the unwanted mode due to rotation and torsion can be shifted to a high frequency band side with less 1/f noise.

With this, in the sensor element SE2 in the second embodiment, not only in the vibration mode in which the mass body MS1 and the mass body MS2 are driven to vibrate in the X direction but also in the unwanted mode due to rotation and torsion, it is possible to provide an angular rate sensor capable of easily performing separation of vibration disturbance and the natural frequency and also capable of sufficiently inhibiting fluctuations of the natural frequency based on temperature change. That is, according to the angular rate sensor in the second embodiment, it is possible to provide an angular rate sensor that is not susceptible to (is robust against) temperature change and vibration disturbance in the implementation environment of the angular rate sensor.

Furthermore, the first feature point in the second embodiment is described in detail. The sensor element SE2 in the second embodiment is configured so that, for example, as illustrated in FIG. 14, the two mass bodies MS1 and MS2 are connected via the link beam BM9, and therefore has a vibration mode like a tuning fork. That is, there is a vibration mode (first mode) in which two mass bodies MS1 and MS2 both vibrate in the same direction and in the same phase in the X direction, and a peak in this first mode is the natural frequency of the first mode. Furthermore, in the second embodiment, there is a vibration mode (second mode) in which two mass bodies MS1 and MS2 vibrate each in a reverse direction (reversed phase) in the X direction, and a peak in this second mode is the natural frequency of the second mode. Here, the natural frequency of the first mode is present on a low frequency band side of the natural frequency of the second mode. In other words, it can be said that the natural frequency of the second mode is present on a high frequency band side of the natural frequency of the first mode.

Furthermore, in the angular rate sensor in the three-point supporting structure in the second embodiment, a third mode and a fourth mode are present on a further high frequency band side of the second mode. These third mode and fourth mode are unwanted modes, and each may be, for example, a mode in which two mass bodies MS1 and MS2 rotate about the X direction or a mode in which they rotate about the Z direction. Unlike the first mode and the second mode corresponding to drive vibration in the X direction, these unwanted modes are determined by inertial moments of the mass body MS1 and the mass body MS2 about a rotation axis and torsion spring constants of the support beams BM1A to BM1D, the support beams BM2A to BM2D, the support beam BM3 and the support beam BM4 about the rotation axis.

Thus, in the unwanted mode, fluctuations due to environment temperature differ from those in the first mode and the second mode, and influences on the natural frequency due to substrate distortion also differ therefrom. That is, to make the sensor element SE2 of the angular rate sensor stably operate in a wide temperature range, it is important to keep the natural frequency of the second mode (drive mode) for use as a drive frequency constant, but it is also important to prevent the natural frequency of the other unwanted mode from overlapping the natural frequency of the second mode (drive mode).

Also, in particular, when the angular rate sensor in the present embodiment is used under adverse environments where wide-range vibration disturbance is present, such as in a brake pressure generation control device in a sideslip prevention system of an automobile, the natural frequency of the second mode (drive mode) is required to be increased as much as possible so as not to be coupled with vibration noise of ambient environment such as vibration disturbance. Furthermore, the natural frequency of the unwanted mode is required to be shifted further higher than the natural frequency of the second mode (drive mode). That is, by adopting the three-point supporting structure, the angular rate sensor in the second embodiment has been developed for the purpose of increasing the natural frequency of the second mode (drive mode) and further increasing the natural frequency of the unwanted mode further higher than the natural frequency of the second mode (drive mode), with a structure robust against substrate distortion.

Thus, in the second embodiment, for example, as illustrated in FIG. 14, the extending portion EXU is provided so as to connect to the fixing portion FU3, this extending portion EXU and the third region P3 which configures part of the mass body MS1 and the mass body MS2 are connected via the support beam BM3 and the support beam BM4, and the support beam BM3 and the support beam BM4 are disposed oppositely to each other with respect to the virtual line IL1 (first feature point).

As a result, according to the second embodiment, with the above-described first feature point, while a structure is adopted in which, while the three-point supporting structure is basically adopted in which the mass body MS1 and the mass body MS2 are supported by the three fixing portions, the mass body MS1 and the mass body MS2 are suspended by four support beams. Therefore, according to the sensor element SE2 in the second embodiment, not only the natural frequency of the vibration mode (second mode) in which the mass body MS1 and the mass body MS2 are driven to vibrate in the X direction but also the natural frequency of the unwanted mode due to rotation and torsion can be shifted to a high frequency band side with less 1/f noise.

The reason is that, according to the second embodiment, the mass body MS1 and the mass body MS2 are suspended by four support beams, and the mass body MS1 and the mass body MS2 become difficult to rotate about the rotation axis (X axis and Z axis). That is, according to the second embodiment, rotational stiffness about the rotation axis can be increased, and therefore the natural frequency of the unwanted mode can be shifted to a high frequency band side.

Next, in addition to the above-described first feature point, the second embodiment also has a second feature point and a third feature point. That is, in the sensor element SE2 in the second embodiment, the mass body MS1 and the mass body MS2 are each configured in an open-end shape including the first region P1, the second region P2, and the third region P3, and part of substrate distortion occurring due to temperature change is absorbed by deformation of the first region P1 and the second region P2 (second feature point). Furthermore, in the second embodiment, for example, as illustrated in FIG. 14, the outer fixing portions OFU1A and OFU1B and the inner fixing portions IFU1A and IFU1B are disposed on the same side (upper side) with respect to the virtual line IL1 passing through the center in the Y direction, and the outer fixing portions OFU1A and OFU1B and the inner fixing portions IFU1A and IFU1B are disposed oppositely with respect to the first region P1. And, the first region P1 and the outer fixing portions OFU1A and OFU1B are connected via the support beams BM1A to BM1B, and the first region P1 and the inner fixing portions IFU1A and IFU1B are connected via the support beams BM1C to BM1D (third feature point).

From this, according to the second embodiment, a change of the natural frequency due to temperature change can reduce matching of the natural frequency and vibration disturbance, thereby effectively inhibiting erroneous operation and failure of the angular rate sensor and improving reliability of the angular rate sensor. In particular, according to the second embodiment, from the above description-described third feature point, for example, when the entire support beams BM1A to BM1D are considered by paying attention to the support beams BM1A to BM1D, internal stress occurring in the support beams BM1A to BM1B and internal stress occurring in the support beams BM1C to BM1D can be reversed. Therefore, fluctuations of the spring constant can be cancelled out. With this, fluctuations of the spring constant can be inhibited for the entire support beams BM1A to BM1D. That is, according to the second embodiment, by a synergistic effect of the second feature point and the third feature point described above, fluctuations of the natural frequency based on temperature change can be sufficiently inhibited. Therefore, furthermore, fluctuations of the sensitivity of the angular rate sensor due to fluctuations of the natural frequency of the vibration system can also be inhibited. As such, since the angular rate sensor in the second embodiment is excellent in resistance to substrate distortion due to environment temperature change, excellent characteristics can be kept also in a wide temperature range, including an automobile engine room with harsh temperature environments.

However, in the second embodiment, for convenience of description, a change of a physical value of the material (for example, monocrystalline silicon) configuring the drive vibration system with environment temperature change is not taken into consideration. In particular, in the case of the support beams BM1A to BM1D, the support beams BM2A to BM2D, the support beam BM3, and the support beam BM4, a definitional equation of a spring constant represented in (Equation 6) includes the Young's modulus of the material.

$$kx = (E \cdot h \cdot b^3)/L^3 \quad \text{(Equation 6)}$$

Here, kx is a spring constant of a support beam, E is the Young's modulus of silicon, b is the width of the support beam, h is the height of the support beam, and L is the length of the support beam.

Therefore, irrespectively of substrate distortion described in the specification, the spring constants of the support beams BM1A to BM1D, the support beams BM2A to BM2D, the support beam BM3, and the support beam BM4 fluctuate with environment temperature change. However, in a temperature range on the order of −40 degrees to 125 degrees such as in an automobile engine room, changes in Young's modulus of silicon exhibit approximately linear behavior, and therefore correction can be made only with a simple arithmetic operation.

On the other hand, unlike the Young's modulus of silicon described above, changes of the spring constant due to substrate distortion are extremely non-linear. For correction, complex arithmetic operation processing is required, and output values of the angular rate sensor at many temperature points are required.

From the above description, in view of inhibiting changes of the spring constant due to substrate distortion, it is required to contrive how to inhibit changes of the spring constant of a support beam due to substrate distortion. Regarding this point, according to the angular rate sensor in the second embodiment, the angular rate sensor has the second feature point and the third feature point described above, and therefore fluctuations of the natural frequency of the drive vibration system can be inhibited also in a wide use temperature range. Thus, according to the angular rate sensor in the second embodiment, high-level and complex temperature characteristic correction by a signal processing circuit is not required, and an improvement in reliability of the angular rate sensor, a decrease in size of the signal processing circuit, simplification of temperature characteristic correction at the time of shipping of the angular rate sensor can be achieved, thereby decreasing manufacturing cost.

In the foregoing, the invention made by the inventor has been specifically described based on the embodiments. However, it is needless to say that the present invention is not limited to the foregoing embodiments and various modifications can be made within the gist of the present invention.

The present invention can be widely used in the field of inertial sensors for use in detection of the orientation of an automobile, robot, or the like, image stabilization in a digital camera, detection of the orientation and direction of a navigation system, detection of the orientation of a game machine, and others. In particular, excellent effects can be provided when use in a mobile body or when a vibration generation source such as a motor, valve, or loudspeaker is present in ambient environments.

DESCRIPTION OF REFERENCE CHARACTERS 1a support substrate
1b insulating layer
1c conductive layer
1S substrate
10A capacitive element
10B capacitive element
21 CV conversion circuit
22 demodulation circuit
30 CV converting portion
31 AD converting portion
32 differential detecting portion
33 synchronous wave detecting portion
34 AFC
35 AGC
36 DA converting portion
40A CV converting portion
40B CV converting portion
41A AD converting portion
41B AD converting portion
42A differential detecting portion
42B differential detecting portion
43A synchronous wave detecting portion
43B synchronous wave detecting portion
44 differential arithmetic operation processing portion
45 LPF
ADH1 adhesive material
ADH2 adhesive material
ASU acceleration detecting portion
BM1A support beam
BM1B support beam
BM1C support beam
BM1D support beam
BM2A support beam
BM2B support beam
BM2C support beam
BM2D support beam
BM3 support beam
BM4 support beam
BM5 fixing beam
BM6 fixing beam
BM7 detecting beam
BM8 detecting beam
BM9 link beam
CAP cap
CE1 Coriolis element
CE2 Coriolis element
CHP1 semiconductor chip
DE1 capacitive element
DE2 capacitive element
EXU extending portion
FP1 free end
FP2 free end
FP3 free end
FP4 free end
FU1 fixing portion
FU2 fixing portion
FU3 fixing portion
IF1 insulating film
IFU1 inner fixing portion
IFU1A inner fixing portion
IFU1B inner fixing portion
IFU2 inner fixing portion
IFU2A inner fixing portion
IFU2B inner fixing portion
IL1 virtual line
ME1 capacitive element
ME2 capacitive element
MR resin
MS mass body
OFU1 outer fixing portion
OFU1A outer fixing portion
OFU1B outer fixing portion
OFU2 outer fixing portion
OFU2A outer fixing portion
OFU2B outer fixing portion
OUT output terminal
P1 first region
P2 second region
P3 third region
P4 fourth region
PD1 pad
PD2 pad S1 acceleration sensor
S2 angular rate sensor
SE1 sensor element
SE2 sensor element
SP space
TAP chip mounting portion
Vc carrier signal
W1 wire
W2 wire
YSU1 angular rate detecting portion
YSU2 angular rate detecting portion

The invention claimed is:

1. An inertial sensor comprising:
   (a) a mass body including a first region extending in a first direction, a second region extending in the first direction as being away by a predetermined distance from the first region in a second direction orthogonal to the first direction, and a third region extending in the second direction so as to be coupled to the first region and the second region, the mass body being displaceable in the first direction;
   (b) a first fixing portion connected to the first region via a first support beam;
   (c) a second fixing portion connected to the second region via a second support beam;
   (d) a third fixing portion;
   (e) an extending portion connected to the third fixing portion and extending in the second direction;
   (f) a third support beam connecting the extending portion and the third region; and
   (g) a fourth support beam connecting the extending portion and the third region,
   wherein the third support beam and the fourth support beam are disposed oppositely to each other with respect to a virtual line passing through the third fixing portion and extending in the first direction.

2. The inertial sensor according to claim 1,
   wherein the third support beam and the fourth support beam are disposed symmetrically with respect to the virtual line.

3. The inertial sensor according to claim 1,
   wherein the first fixing portion includes a first outer fixing portion and a first inner fixing portion,
   the first support beam includes a first outer support beam and a first inner support beam,
   the first region is connected to the first outer fixing portion via the first outer support beam, and is connected to the first inner fixing portion via the first inner support beam, and
   the first outer fixing portion and the first inner fixing portion are disposed on a same side with respect to the virtual line.

4. The inertial sensor according to claim 3,
   wherein the first outer fixing portion and the first inner fixing portion are disposed oppositely with respect to the first region.

5. The inertial sensor according to claim 3,
   wherein the first outer support beam includes:
   a first connecting beam which connects the first region and a first free end; and
   a second connecting beam which connects the first free end and the first outer fixing portion, and
   the first inner support beam includes:
   a third connecting beam which connects the first region and a second free end; and
   a fourth connecting beam which connects the second free end and the first inner fixing portion.

6. The inertial sensor according to claim 1,
   wherein the second fixing portion includes a second outer fixing portion and a second inner fixing portion,
   the second support beam includes a second outer support beam and a second inner support beam,
   the first region is connected to the second outer fixing portion via the second outer support beam, and is connected to the second inner fixing portion via the second inner support beam, and
   the second outer fixing portion and the second inner fixing portion are disposed on a same side with respect to the virtual line.

7. The inertial sensor according to claim 6,
   wherein the second outer fixing portion and the second inner fixing portion are disposed oppositely with respect to the first region.

8. The inertial sensor according to claim 6,
   wherein the second outer support beam includes:
   a fifth connecting beam which connects the first region and a third free end; and
   a sixth connecting beam which connects the third free end and the second outer fixing portion, and
   the second inner support beam includes:
   a seventh connecting beam which connects the first region and a fourth free end; and
   an eighth connecting beam which connects the fourth free end and the second inner fixing portion.

9. The inertial sensor according to claim 1,
   wherein the inertial sensor is an acceleration sensor.

10. The inertial sensor according to claim 9,
    wherein the acceleration sensor has an acceleration detecting portion which captures displacement of the mass body in the first direction as a change of an electrostatic capacity value.

11. The inertial sensor according to claim 1,
    wherein the inertial sensor is an angular rate sensor.

12. The inertial sensor according to claim 11,
    wherein the angular rate sensor includes:
    a Coriolis element connected to the mass body via a detecting beam, the Coriolis element which is displaced in the second direction, with the mass body being vibrated in the first direction, when angular rate is applied about a third direction orthogonal to the first direction and the second direction; and
    an angular rate detecting portion which captures displacement of the Coriolis element in the second direction as a change of an electrostatic capacity value.

13. The inertial sensor according to claim 1,
    wherein the third fixing portion is disposed on a center line in the second direction.

14. The inertial sensor according to claim 1,
    wherein, of a vibration system configured of the mass body, the first support beam, the second support beam, the third support beam, and the fourth support beam, a mode with a lowest frequency is a mode in which the mass body vibrates in the first direction.

* * * * *